United States Patent
Bishnoi et al.

(10) Patent No.: US 10,644,932 B2
(45) Date of Patent: *May 5, 2020

(54) VARIABLE DURATION WINDOWS ON CONTINUOUS DATA STREAMS

(71) Applicant: Oracle International Corporation, Redwood Shores, CA (US)

(72) Inventors: Sandeep Bishnoi, Pleasanton, CA (US); Anand Srinivasan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/265,610

(22) Filed: Feb. 1, 2019

(65) Prior Publication Data

US 2019/0165990 A1    May 30, 2019

Related U.S. Application Data

(63) Continuation of application No. 13/838,259, filed on Mar. 15, 2013, now Pat. No. 10,298,444.

(Continued)

(51) Int. Cl.
    *H04L 12/24*    (2006.01)
(52) U.S. Cl.
    CPC ........ *H04L 41/069* (2013.01); *H04L 41/0622* (2013.01); *H04L 41/0686* (2013.01)
(58) Field of Classification Search
    CPC ............... H04L 41/069; H04L 41/0622; H04L 41/0686; G06F 16/24568

(Continued)

(56) References Cited

U.S. PATENT DOCUMENTS 5,691,917 A    11/1997 Harrison
5,802,523 A    9/1998 Jasuja et al.
(Continued)

FOREIGN PATENT DOCUMENTS

CN    1478235    2/2004
CN    101866353    10/2010
(Continued)

OTHER PUBLICATIONS

U.S. Appl. No. 13/193,377, Final Office Action dated Jan. 17, 2013, 25 pages.

(Continued)

*Primary Examiner* — Vivek Srivastava
*Assistant Examiner* — Binod J Kunwar
(74) *Attorney, Agent, or Firm* — Kilpatrick Townsend & Stockton LLP

(57) ABSTRACT

Improved techniques are provided for processing streams of data. The duration of the time that an event is eligible for remaining in a time-based window can be variable for different events received via the same event stream. In certain embodiments, the duration of time that an input event spends in a time-based window is a function of one or more values of one or more attributes of the event. Since different events can have different one or more attribute values, the different events can spend different amounts of time in the time-based window for that event stream. The amount of time that an event spends in a time-based window can be controlled via the one or more attributes of the event.

20 Claims, 8 Drawing Sheets

Related U.S. Application Data

(60) Provisional application No. 61/752,850, filed on Jan. 15, 2013.

(58) Field of Classification Search
USPC .................................................. 709/224
See application file for complete search history.

(56) References Cited

U.S. PATENT DOCUMENTS

| | | | |
|---|---|---|---|
| 6,041,344 A | 3/2000 | Bodamer et al. | |
| 6,128,415 A | 10/2000 | Hultgren, III et al. | |
| 6,219,660 B1 | 4/2001 | Haderle et al. | |
| 6,766,330 B1 | 7/2004 | Chen et al. | |
| 6,954,791 B2 | 10/2005 | Darby | |
| 6,985,904 B1 | 1/2006 | Kaluskar et al. | |
| 7,035,914 B1 | 4/2006 | Payne et al. | |
| 7,047,249 B1 | 5/2006 | Vincent | |
| 7,263,464 B1 | 8/2007 | Dugger | |
| 7,644,019 B2 | 1/2010 | Woda et al. | |
| 7,653,645 B1 | 1/2010 | Stokes | |
| 7,693,891 B2 | 4/2010 | Stokes et al. | |
| 7,711,782 B2 | 5/2010 | Kim et al. | |
| 7,818,313 B1 | 10/2010 | Tsimelzon et al. | |
| 7,912,853 B2 | 3/2011 | Agrawal | |
| 7,953,728 B2 | 5/2011 | Hu et al. | |
| 7,954,109 B1 | 5/2011 | Durham et al. | |
| 7,987,204 B2 | 7/2011 | Stokes | |
| 8,019,060 B2 | 9/2011 | Martino | |
| 8,112,378 B2 | 2/2012 | Kudo et al. | |
| 8,195,648 B2 | 6/2012 | Zabback et al. | |
| 8,458,175 B2 | 6/2013 | Stokes | |
| 8,589,436 B2 | 11/2013 | Srinivasan et al. | |
| 8,713,049 B2 | 4/2014 | Jain et al. | |
| 8,745,070 B2 | 6/2014 | Krishnamurthy et al. | |
| 9,110,945 B2 | 8/2015 | Jain et al. | |
| 9,390,135 B2 | 7/2016 | Alves et al. | |
| 9,418,113 B2 | 8/2016 | Bishnoi et al. | |
| 10,298,444 B2 | 5/2019 | Bishnoi et al. | |
| 2002/0023211 A1 | 2/2002 | Roth et al. | |
| 2002/0049788 A1 | 4/2002 | Lipkin et al. | |
| 2003/0236766 A1 | 12/2003 | Fortuna et al. | |
| 2004/0088404 A1 | 5/2004 | Aggarwal | |
| 2004/0201612 A1 | 10/2004 | Hild et al. | |
| 2006/0015482 A1 | 1/2006 | Beyer et al. | |
| 2006/0167856 A1 | 7/2006 | Angele et al. | |
| 2008/0195577 A1 | 8/2008 | Fan et al. | |
| 2008/0275891 A1 | 11/2008 | Park et al. | |
| 2008/0301125 A1 | 12/2008 | Alves et al. | |
| 2009/0106215 A1 | 4/2009 | Jain et al. | |
| 2009/0106218 A1 | 4/2009 | Srinivasan et al. | |
| 2009/0112779 A1 | 4/2009 | Wolf et al. | |
| 2009/0112802 A1 | 4/2009 | Srinivasan et al. | |
| 2009/0112853 A1 | 4/2009 | Nishizawa et al. | |
| 2009/0213798 A1 | 8/2009 | Li | |
| 2009/0222730 A1 | 9/2009 | Wixson et al. | |
| 2009/0293046 A1 | 11/2009 | Cheriton | |
| 2009/0313198 A1 | 12/2009 | Kudo et al. | |
| 2010/0017380 A1 | 1/2010 | Naibo et al. | |
| 2010/0057737 A1 | 3/2010 | Srinivasan et al. | |
| 2010/0082578 A1 | 4/2010 | Werner | |
| 2010/0106710 A1 | 4/2010 | Nishizawa et al. | |
| 2010/0223283 A1* | 9/2010 | Lee | H04L 67/2823 707/769 |
| 2010/0223606 A1 | 9/2010 | Park et al. | |
| 2011/0004621 A1 | 1/2011 | Kelley et al. | |
| 2011/0016160 A1 | 1/2011 | Zhang et al. | |
| 2011/0032260 A1 | 2/2011 | Duggan et al. | |
| 2011/0093491 A1 | 4/2011 | Zabback et al. | |
| 2011/0161397 A1 | 6/2011 | Bekiares et al. | |
| 2011/0178775 A1 | 7/2011 | Schoning et al. | |
| 2011/0196839 A1 | 8/2011 | Smith et al. | |
| 2011/0246445 A1* | 10/2011 | Mishra | G06F 16/24568 707/713 |
| 2011/0282812 A1 | 11/2011 | Chandramouli et al. | |
| 2011/0314019 A1* | 12/2011 | Jimenez Peris | G06F 9/5066 707/737 |
| 2012/0072455 A1 | 3/2012 | Jain et al. | |
| 2012/0166417 A1 | 6/2012 | Chandramouli et al. | |
| 2012/0278473 A1 | 11/2012 | Griffiths | |
| 2012/0284420 A1 | 11/2012 | Shukla et al. | |
| 2012/0290715 A1 | 11/2012 | Dinger et al. | |
| 2012/0323941 A1* | 12/2012 | Chkodrov | G06F 16/24568 707/756 |
| 2013/0014094 A1* | 1/2013 | Chkodrov | G06F 16/24568 717/143 |
| 2013/0031567 A1 | 1/2013 | Nano et al. | |
| 2013/0117317 A1* | 5/2013 | Wolf | G06F 16/24568 707/792 |
| 2013/0275452 A1 | 10/2013 | Krishnamurthy et al. | |
| 2014/0095445 A1 | 4/2014 | Deshmukh et al. | |
| 2014/0136514 A1 | 5/2014 | Jain et al. | |
| 2014/0201225 A1 | 7/2014 | Deshmukh et al. | |
| 2014/0201355 A1 | 7/2014 | Bishnoi et al. | |
| 2014/0358959 A1 | 12/2014 | Bishnoi et al. | |
| 2015/0317363 A1* | 11/2015 | Manzano Macho | G06N 20/00 706/12 |

FOREIGN PATENT DOCUMENTS

| | | |
|---|---|---|
| CN | 102135984 | 7/2011 |
| CN | 102665207 | 9/2012 |
| CN | 102687134 | 9/2012 |
| CN | 102892073 | 1/2013 |
| JP | 2009134689 | 6/2009 |
| JP | 2010108073 | 5/2010 |
| JP | 2011518359 | 6/2011 |
| JP | 2013008329 | 1/2013 |
| WO | 2007122347 | 11/2007 |
| WO | 2011142026 | 11/2011 |
| WO | 2012037511 | 3/2012 |
| WO | 2012172600 | 12/2012 |
| WO | 2014113273 | 7/2014 |
| WO | 2014193943 | 12/2014 |

OTHER PUBLICATIONS

U.S. Appl. No. 13/193,377, Non-Final Office Action dated Aug. 23, 2012, 21 pages.
U.S. Appl. No. 13/193,377, Advisory Action dated Mar. 20, 2013, 3 pages.
U.S. Appl. No. 13/193,377, Notice of Allowance dated Aug. 30, 2013, 19 pages.
U.S. Appl. No. 13/838,259, Applicant Initiated Interview Summary dated Oct. 13, 2017, 3 pages.
U.S. Appl. No. 13/838,259, Final Office Action dated Feb. 19, 2016, 47 pages.
U.S. Appl. No. 13/838,259, Final Office Action dated Jul. 7, 2017, 69 pages.
U.S. Appl. No. 13/838,259, Final Office Action dated Jun. 14, 2018, 80 pages.
U.S. Appl. No. 13/838,259, Non-Final Office Action dated Oct. 24, 2014, 21 pages.
U.S. Appl. No. 13/838,259, Non-Final Office Action dated Jun. 9, 2015, 37 pages.
U.S. Appl. No. 13/838,259, Non-Final Office Action dated Jan. 4, 2017, 65 pages.
U.S. Appl. No. 13/838,259, Non-Final Office Action dated Nov. 27, 2017, 69 pages.
U.S. Appl. No. 13/838,259, Notice of Allowance dated Nov. 23, 2018, 12 pages.
U.S. Appl. No. 13/906,162, Final Office Action dated Jun. 10, 2015, 10 pages.
U.S. Appl. No. 13/906,162, Non-Final Office Action dated Dec. 29, 2014, 10 pages.
U.S. Appl. No. 13/906,162, Non-Final Office Action dated Oct. 28, 2015, 11 pages.
U.S. Appl. No. 13/906,162, Notice of Allowance dated Apr. 5, 2016, 7 pages.

(56) References Cited

OTHER PUBLICATIONS

U.S. Appl. No. 14/077,230, Non-Final Office Action dated Dec. 4, 2014, 30 pages.
U.S. Appl. No. 14/077,230, Notice of Allowance dated Apr. 16, 2015, 16 pages.
Arasu et al., The CQL Continuous Query Language: Semantic Foundations and Query Execution, The VLDB Journal, vol. 15, No. 2, Jul. 22, 2005, pp. 121-142.
Chinese Application No. 201180053021.4, Office Action dated Oct. 28, 2015, 17 pages (9 pages of English translation and 8 pages of original document).
Chinese Application No. 201180053021.4, Office Action dated May 27, 2016, 8 pages. (4 pages of English translation and 4 pages of original document).
Chinese Application No. 201480004731.1, Office Action dated Apr. 4, 2018, 13 pages (7 pages of English translation and 5 pages of original document).
Chinese Application No. 201480004731.1, Office Action dated Dec. 28, 2018, 3 pages.
Chinese Application No. 201480030482.3, Office Action dated Feb. 4, 2017, 5 pages.
European Application No. 11761766.2, Office Action dated Sep. 5, 2018, 7 pages.
European Application No. 14733856.0, Office Action dated Aug. 9, 2018, 8 pages.
European Application No. 14733856.0, Summons to Attend Oral Proceedings dated Jan. 17, 2019, 10 pages.
Hao et al., Achieving High Performance Web Applications by Service and Database Replications at Edge Servers, Performance Computing and Communications Conference (IPCCC) IEEE 28th International, IEEE, Piscataway, NJ, USA, Dec. 2009, pp. 153-160.
Japanese Application No. 2013-529376, Office Action dated Aug. 18, 2015, 2 pages.
Japanese Application No. 2015-552781, Office Action dated Aug. 7, 2018, 4 pages.
Japanese Application No. 2015-552781, Office Action dated Nov. 21, 2017, 4 pages.
Japanese Application No. 2016-516778, Office Action dated May 22, 2018, 8 pages.
Japanese Application No. 2016-516778, Office Action dated Oct. 23, 2018, 9 pages (4 pages of English translation and 5 pages of original document).
International Application No. PCT/US2011/052019, International Preliminary Report on Patentability dated Mar. 28, 2013, 6 pages.
International Application No. PCT/US2011/052019, International Search Report and Written Opinion dated Nov. 17, 2011, 9 pages.
International Application No. PCT/US2014/010920, International Preliminary Report on Patentability dated Jul. 29, 2015, 7 pages.
International Application No. PCT/US2014/010920, International Search Report and Written Opinion dated Dec. 15, 2014, 10 pages.
International Application No. PCT/US2014/039771, International Preliminary Report on Patentability dated Jul. 29, 2015, 8 pages.
International Application No. PCT/US2014/039771, International Search Report and Written Opinion dated Sep. 24, 2014, 10 pages.
International Application No. PCT/US2014/039771, Written Opinion dated Apr. 29, 2015, 6 pages.
Japanese Application No. 2018-230013, Office Action dated Nov. 12, 2019, 4 pages.
China Patent Application CN201611125047.6, Office Action dated Jul. 2, 2019, 11 pages.
India Patent Application IN3363/CHENP/2015, First Examination Report dated Jun. 7, 2019, 6 pages.
Japan Paent Application JP2016-516778, Notice of Decision to Grant dated Mar. 12, 2019, 6 pages.

\* cited by examiner

VARIABLE DURATION WINDOWS ON CONTINUOUS DATA STREAMS

CROSS-REFERENCE TO RELATED APPLICATION

The present application is a continuation of, and claims the benefit and priority to U.S. application Ser. No. 13/838,259, filed Mar. 15, 2013, entitled "VARIABLE DURATION WINDOWS ON CONTINUOUS DATA STREAMS", which claims the benefit and priority under 35 U.S.C. 119(e) of U.S. Provisional Application No. 61/752,850, filed Jan. 15, 2013, entitled VARIABLE DURATION WINDOWS ON CONTINUOUS DATA STREAMS, the entire contents of each are hereby incorporated by reference for all purposes.

BACKGROUND

The disclosed embodiments relate generally to data processing systems, and more specifically to techniques for processing continuous event streams using variable duration windows.

In traditional database systems, data is stored in one or more databases usually in the form of tables. The stored data is then queried and manipulated using a data management language such as SQL. For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. For example, a temperature sensor may be configured to send out temperature readings. Such applications have given rise to a need for a new breed of applications that can process the data streams.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's events processing needs.

BRIEF SUMMARY

Certain embodiments of the present invention relate generally to data processing systems, and more specifically to techniques for processing continuous event streams using variable duration windows.

In certain embodiments, the duration of the time that an event is eligible for remaining in a time-based window can be variable for different events received via the same event stream. For example, for a first input event received via the event stream, the duration of time that the first event is eligible for remaining in a time-based range window may be "X", and for a second event received via the same event stream, the duration of time that the second event is eligible to remain in the time-based window may be "Y", where X is not the same as Y. The first and second events may have the same associated timestamp or different timestamps. Embodiments of the present invention thus enable the amount of time that an event spends in a time-based window to be controlled.

In certain embodiments, the duration of time that an input event spends in a time-based window is a function of one or more values of one or more attributes of the event. Since different events can have different one or more attribute values, the different events can spend different amounts of time in a time-based window. This enables the amount of time that an event spends in a time-based window to be controlled via one or more attributes of the event.

In one embodiment, multiple events may be received by a computing device via an event stream. For example, a first event and a second event may be received via the event stream. A first duration of time may be determined for the first event, where the first duration of time indicates a time duration that the first event is eligible to remain in a time-based window specified for the event stream. A second duration of time may be determined for the second event, where the second duration of time indicates a time duration that the second event is eligible to remain in the time-based window, wherein the second time duration is different from the first time duration.

In certain embodiment, the first and second events may be added to the time-based window specified for the event stream. The first event remains in the time-based window for the first duration of time and is then removed or deleted from the time-based window. The second event remains in the time-based window for the second duration of time and is then removed or deleted from the time-based window. In this manner, the duration of time that the first event spends in the time-based window may be different from the duration of time that the second event spends in the time-based window.

In the first and second events example embodiment described above, the first event may have an associated first time and the second event may have an associated second time. In one instance, the first time and the second time may be the same. In a second instance, the first time may be different from the second time.

In certain embodiments, the duration of time that an event is eligible to spend in the time-based window may be based upon values of one or more attributes of the event.

In certain embodiments, row-time range windows may be different partitions. The partition to which an event belongs may be based upon a value of an attribute of the first event. The amount of time that an event is eligible to spend in a row-time range window for a partition may be based upon one or more values of one or more attributes of the event. Accordingly, for events belonging to a particular partition, different events may be eligible to spend different durations of time in the row-time range window for the particular partition.

In certain embodiments, a first expiration time may be computed for the first event based upon a first time associated with the first event and the first duration of time. A second expiration time may be determined for the second event based upon a second time associated with the second event and the second duration of time. The first event is removed or deleted from the time-based window at or after the occurrence of the first expiration time. Likewise, the second event may be removed or deleted from the time-based window at or after the occurrence of the second expiration time.

The following detailed description together with the accompanying drawings will provide a better understanding of the nature of embodiments of the present invention.

DETAILED DESCRIPTION

Figure 1:
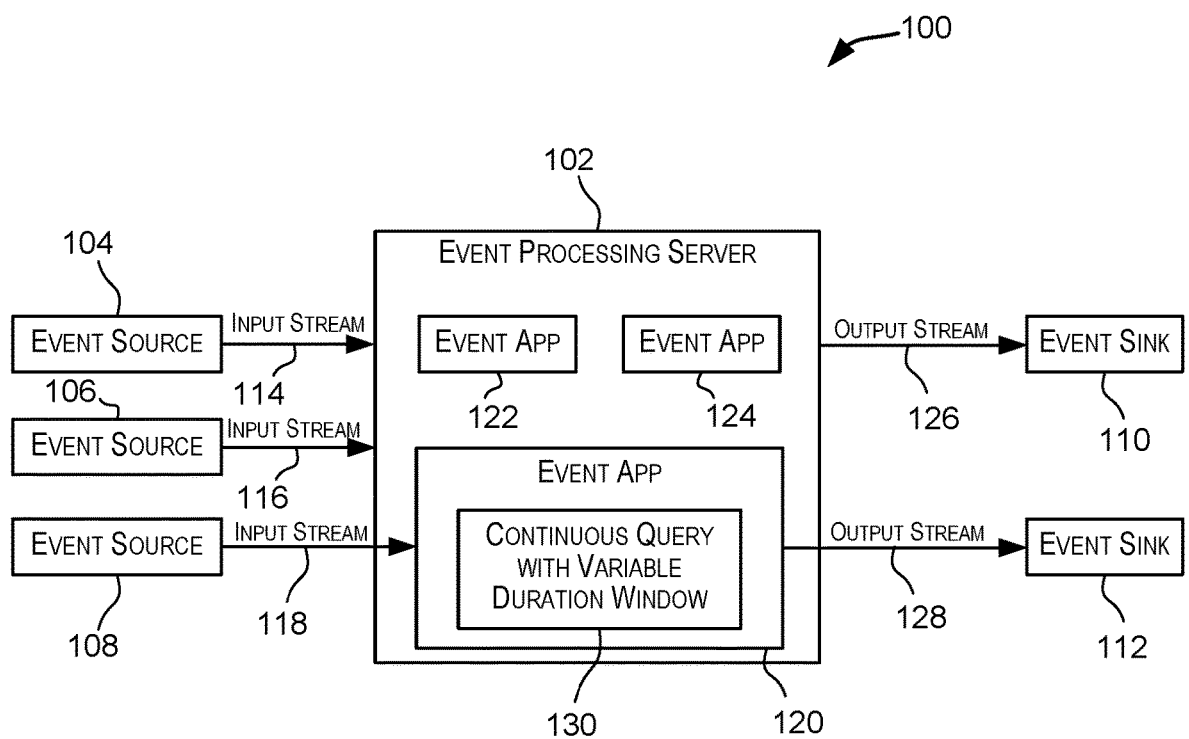
FIG. 1 depicts a simplified high level diagram of an event processing system that may incorporate an embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Certain embodiments are described that provide improved techniques for processing streams of data. The duration of the time that an event is eligible for remaining in a time-based window can be variable for different events received via the same event stream. In certain embodiments, the duration of time that an input event spends in a time-based window is a function of one or more values of one or more attributes of the event. Since different events can have different one or more attribute values, the different events can spend different amounts of time in the time-based window for that event stream. The amount of time that an event spends in a time-based window can be controlled via the one or more attributes of the event.

A continuous data stream (also referred to as an event stream) is a stream of data or events that may be continuous or unbounded in nature with no explicit end. Logically, an event or data stream is a sequence of data elements (also referred to as events), each data element having an associated timestamp. A continuous event stream may be logically represented as a bag or set of elements (s, T), where "s" represents the data portion and "T" is in the time domain. The "s" portion is generally referred to as a tuple or event. An event stream is thus a sequence of time-stamped tuples or events.

In some embodiments, the timestamps associated with events in a stream may equate to a clock time. In other embodiments, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of temporal sequence. For a system receiving an input event stream, the events arrive at the system in the order of increasing timestamps. There could be more than one event with the same timestamp.

In some embodiments, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event is used to ensure that the events in the event stream arrive in the order of increasing timestamp values. This enables events received in the event stream to be ordered and processed based upon their associated time information. In order to enable this ordering, timestamps are associated with events in an event stream in a non-decreasing manner such that a later-generated event has a later timestamp than an earlier-generated event. As another example, if sequence numbers are being used as time information, then the sequence number associated with a later-generated event is greater than the sequence number associated with an earlier-generated event. Events belonging to the same event stream are generally processed in the order imposed on the events by the associated time information, with earlier events being processed prior to later events. In some embodiments, multiple events may be associated with the same timestamp or sequence number, for example, when the worldly events represented by the data stream events occur at the same time. In these situations, the events are processed in the order received.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S", the schema comprising time information and a set of one or more named attributes. All events that belong to a particular event stream conform to the schema associated with that particular event stream. Accordingly, for an event stream (s, T), the event stream may have a schema "S" as (<time_stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

```
...
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
...
```

In the above stream, for stream element (<timestamp_N+1>, <ORCL,62>), the event values for attributes "stock_symbol" and "stock_value" are ORCL and 62, respectively. The timestamp associated with the stream element is "timestamp_N+1". A continuous event stream is thus a flow of events, each event having the same series of attributes.

FIG. 1 depicts a simplified high level diagram of an event processing system 100 that may incorporate an embodiment of the present invention. Event processing system 100 may comprise one or more event sources (104, 106, 108), an event processing server (EPS) 102 that is configured to provide an environment for processing event streams, and one or more event sinks (110, 112). The event sources generate event streams that are received by EPS 102. EPS 102 may receive one or more event streams from one or more event sources. For example, as shown in FIG. 1, EPS 102 receives an input event stream 114 from event source 104, a second input event stream 116 from event source 106, and a third event stream 118 from event source 108. One or more event processing applications (120, 122, and 124) may be deployed on and be executed by EPS 102. An event processing application executed by EPS 102 may be configured to listen to one or more input event streams, process the events received via the one or more event streams based upon processing logic that selects one or more events from the input event streams as notable events. The notable events may then be sent to one or more event sinks (110, 112) in the form of one or more output event streams. For example, in FIG. 1, EPS 102 outputs an output event stream 126 to event sink 110, and a second output event stream 128 to event sink 112. In certain embodiments, event sources, event processing applications, and event sinks are decoupled from each other such that one can add or remove any of these components without causing changes to the other components.

In one embodiment, EPS 102 may be implemented as a Java server comprising a lightweight Java application container, such as one based upon Equinox OSGi, with shared services. In some embodiments, EPS 102 may support ultra-high throughput and microsecond latency for processing events, for example, by using JRockit Real Time. EPS 102 may also provide a development platform (e.g., a complete real time end-to-end Java Event-Driven Architecture (EDA) development platform) including tools (e.g., Oracle CEP Visualizer and Oracle CEP IDE) for developing event processing applications.

An event processing application is configured to listen to one or more input event streams, execute logic (e.g., a query) for selecting one or more notable events from the one or more input event streams, and output the selected notable events to one or more event sources via one or more output event streams. FIG. 1 provides a drilldown for one such event processing application 120. As shown in FIG. 1, event processing application 120 is configured to listen to input event stream 118, execute a query 130 comprising logic for selecting one or more notable events from input event stream 118, and output the selected notable events via output event stream 128 to event sink 112. Examples of event sources include, without limitation, an adapter (e.g., JMS, HTTP, and file), a channel, a processor, a table, a cache, and the like. Examples of event sinks include, without limitation, an adapter (e.g., JMS, HTTP, and file), a channel, a processor, a cache, and the like.

Although event processing application 120 in FIG. 1 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real time as the events are received by EPS 102 without having to store all the received events data. Accordingly, EPS 102 provides a special querying mechanism that enables processing of events to be performed as the events are received by EPS 102 without having to store all the received events.

Event-driven applications are rule-driven and these rules may be expressed in the form of continuous queries that are used to process input streams. A continuous query may comprise instructions (e.g., business logic) that identify the processing to be performed for received events including what events are to be selected as notable events and output as results of the query processing. Continuous queries may be persisted to a data store and used for processing input streams of events and generating output streams of events. Continuous queries may specify filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with EPS 102 for a particular event stream may be executed each time that an event is received in that event stream. As part of the continuous query execution, EPS 102 evaluates the received event based upon instructions specified by the continuous query to determine whether one or more events are to be selected as notable events, and output as a result of the continuous query execution.

A continuous query may be programmed using different languages. In certain embodiments, continuous queries may be configured using the Continuous Query Language (CQL) provided by Oracle Corporation and used by Oracle's Complex Events Processing (CEP) product offerings. Oracle's CQL is a declarative language that can be used to program queries (referred to as CQL queries) that can be executed against event streams. In certain embodiments, CQL is based upon SQL with added constructs that support processing of streaming events data.

In one embodiment, an event processing application may be composed of the following component types:
(1) One or more adapters that interface directly to the input and output stream and relation sources and sinks. Adapters are configured to understand the input and output stream protocol, and are responsible for converting the event data into a normalized form that can be queried by an application processor. Adapters may forward the normalized event data into channels or output streams and relation sinks. Event adapters may be defined for a variety of data sources and sinks.

(2) One or more channels that act as event processing endpoints. Among other things, channels are responsible for queuing event data until the event processing agent can act upon it.

(3) One or more application processors (or event processing agents) are configured to consume normalized event data from a channel, process it using queries to select notable events, and forward (or copy) the selected notable events to an output channel.

(4) One or more beans may be configured or registered to listen to the output channel, and may be triggered by the insertion of a new event into the output channel. In some embodiments, this user code is a plain-old-Java-object (POJO) or the user code may use Oracle CEP event bean API so that the bean can be managed by Oracle CEP. The user application can make use of a set of external services, such as JMS, Web services, and file writers, to forward the generated events to external event sinks.

In one embodiment, an event adapter provides event data to an input channel. The input channel is connected to a CQL processor associated with one or more CQL queries that operate on the events offered by the input channel. The CQL processor is connected to an output channel to which query results are written.

In some embodiments, an assembly file may be provided for an event processing application describing the various components of the event processing application, how the components are connected together, event types processed by the application. Separate files may be provided for specifying the continuous query or business logic for selection of events.

It should be appreciated that system 100 depicted in FIG. 1 may have other components than those depicted in FIG. 1. Further, the embodiment shown in FIG. 1 is only one example of a system that may incorporate an embodiment of the invention. In some other embodiments, system 100 may have more or fewer components than shown in FIG. 1, may combine two or more components, or may have a different configuration or arrangement of components. System 100 can be of various types including a personal computer, a portable device (e.g., a mobile telephone or device), a workstation, a network computer, a mainframe, a kiosk, a server, or any other data processing system. In some other embodiments, system 100 may be configured as a distributed system where one or more components of system 100 are distributed across one or more networks in the cloud.

The one or more of the components depicted in FIG. 1 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Examples of Events and Applications (1) Financial algorithmic trading application for automating stock trading based on market movement. Sample query: if, within any 20 second window, StockB rises by more than 2% and StockA does not, then automatically buy StockA.

(2) Transportation: Security and Fraud Detection application for discovering fraudulent activity by detecting patterns among events. Sample query: if a single ID card is used twice in less than 5 seconds to gain access to a city's subway system, alert security for piggybacking.

(3) Energy and telecommunications alarm correlation application for reducing false positive alarms. Sample query: When 15 alarms are received within any 5 second window, but less than 5 similar alarms detected within 30 seconds, then do nothing.

(4) Health care patient monitoring application for monitoring the vital signs of a patient and performing some task if a particular event happens. Sample query: When a change in medication is followed by a rise in blood pressure within 20% of maximum allowable for this patient within any 10 second window, alert nearest nurse.

Window-Based Processing

As another example, an event processing application may be configured to collate and process data or events for a certain time range. For example, EPS 102 may receive a temperature event stream of events comprising a "temp" attribute and an associated time. The "temp" data may indicate the temperature at the associated time. A CQL query may be formulated for such an event stream to obtain the average temperature for the previous ten seconds. The query may be specified as follows:

Select avg (temp) from temp [range 10]

The above query finds the average of the "temp" data over a range of "10", where, in this example, a range of "10" indicates 10 seconds. In other embodiments, the range may be specified using other time units such as minutes, days, or any other specified time unit. The CQL query, when executed by EPS 102, evaluates tuples received in the previous ten seconds and finds the average temperature. "Expired" tuples, or those tuples that are received previous to the indicated range (i.e., outside the 10 second window) are disregarded by the query. The CQL query thus does not need to account for and store all the received events but only process events within the last 10 second window.

Since an event stream represents a potentially endless stream of tuples, in order to process tuples as they are received, a CQL query (or a continuous query in general) identifies a subset of the received events that is to be used for processing at each execution of the CQL query. A CQL query accomplishes this by specifying a window, where the window defines a subset (or portion) of the received events to be used for processing purposes when the CQL query is executed. A window is a bound subset of zero or more events from the events stream.

In Oracle Event Processing CQL semantics, a window is defined as a stream-to-relation operator, where, at every instant in time, a relation is an unordered, time-varying bounded set (or bag) of events. In one embodiment, the stream-to-relationship operator provides a sliding window over a stream and is defined using a window specification. In some embodiments, a window can be (1) time-based—based upon a specific duration of time;

(2) tuple-based or event-based—based upon a number of events; or (3) partition-based—time-based or tuple-based for each partition.

Time-Based Windows

For purposes of processing an event stream, a time-based window is defined using a time parameter that controls the events that are included within that window. In some embodiments, the time parameter may specify a range of time for the window. For example, a CQL query may specify a time range-based window for an input stream S as follows:
S[range T]
The above CQL code creates a time-based range window on a stream that takes a time duration "T" as a parameter and produces an output relationship. The time duration T may be specified in some unit of time such as minutes, seconds, days, etc. and, in one embodiment, defaults to seconds if no unit is specified. Thus, a time-based window specified using a "range" keyword creates a time-based sliding window on stream S that takes time interval "T" as a parameter and produces an output relation "R(t)". At a time "t", output relation R(t) contains all events from input event stream S with an associated timestamp between "t−T" and "t", where "T" is the size or duration of the window.

In previous implementations of time-based range windows, the time parameter "T" used for specifying the duration of the time window in a CQL was constant or fixed. Accordingly, in prior implementations, the amount of time each event spends in a time-based window does not vary with the event itself. All events are treated the same with all events staying in the time-based window for the same duration of time. For example, in the temperature average example CQL query described earlier, the range was specified as "[range 10], where the value of "T" is set to a fixed value "10" denoting 10 seconds. Due to the fixed non-variable nature of the range window, at time "t", the window evaluates a relation set of events received in the last 10 seconds (i.e., between "t" and "t−10"). It is to be noted that while the window itself slides with "t", the duration of the window is always fixed to 10 seconds. Due to the fixed time duration, previously, events in a time-based window always expired after the same duration of time in the time window.

In addition to fixed or constant time-based range windows, certain embodiments of the present invention, allow the duration of the time-based window to be variable for different events received via the same event stream. In such embodiments, the value of time duration parameter "T" used for defining the duration of the sliding time-based range window can be different, and thus variable, for different events. Accordingly, for a query registered with EPS 102 for a particular event stream, the duration of time that events received via the event stream may be different for different events. For example, as shown in FIG. 1, event application 120 may comprise continuous query 130 with CQL code specifying a variable time-based window.

For example, for a first input event received via the event stream, the duration of time that the first event is eligible for remaining in a time-based range window may be "X", and for a second event received via the same event stream, the duration of time that the second event is eligible to remain in the time-based window may be "Y", where X is not the same as Y. The first and second events may have the same associated timestamp or different timestamps. Embodiments of the present invention thus enable the amount of time that an event spends in a time-based window to be controlled.

There are various ways in which the value of the variable range duration parameter T can be set for an event. In some embodiments, the duration parameter T may be user-configurable. In certain embodiments, the value of T (i.e., the duration of the time-based range window) is a function of the event itself. For example, the value of T for a received event may be set based upon values of one or more attributes of the received event. For example, assume an event stream with an associated schema having two attributes <attr_1, attr_2>. In one embodiment, in a CQL query directed to the event stream, the time that an event can spend in a time-based range window may be programmed to be set to the value of attribute "attr_2". For example, if the event stream receives events as follows:
. . .
(<timestamp_N>, <attr_1=100, attr_2=5>)
(<timestamp_N+1>, <attr_1=100, attr_2=2>)
(<timestamp_N+2>, <attr_1=200, attr_2=2>)
(<timestamp_N+3>, <attr_1=600, attr_2=4>)
. . .
When the event with timestamp_N is received, the duration of time that the event can remain in the time-based range window is computed to be 5 time units since the value of attr_2 of the tuple is 5; for the event with timestamp_N+1, the duration of time that the event can remain in the time-based range window is computed to be 2 time units; for the event with timestamp_N+2, the duration of time that the event can remain in the time-based range window is computed to be 2 time units; for the event with timestamp_N+3, the duration of time that the event can remain in the time-based range window is computed to be 4 time units; and so on. In this manner, the duration of time that an event is eligible to remain in the time-based window for the event stream can vary from one event to another. In the example above, the duration changes based upon the value of the "attr_2" attribute of the received events.

In some other embodiments, the time parameter T may be expressed as a mathematical expression as follows:
S [RANGE <mathematical_expression>]
In certain embodiments, the mathematical expression may be based upon one or more attributes of an event stream schema. For example, for the event stream with schema attributes <attr_1, attr_2>, the <mathematical_expression> may be defined as <attr_2+4>, <attr_1+attr_2>, etc. In alternative embodiments, other functions or conditions, which may or may not be event-based, may also be used to set and vary the duration of the time-based range window for a continuous query.

As another example, suppose a stream is defined as:
CREATE STREAM S (DATA INTEGER, RANGE_COLUMN BIGINT);
Per this definition, each stream event contains two attributes (also referred to as columns), a first attribute "DATA" that takes an integer data value and a second attribute "RANGE_COLUMN" that takes a bigint (long) value. The "RANGE_COLUMN" attribute may then be used to specify the duration of a time-based range window.

A CQL query specifying a variable duration time-based range window may be specified on stream S as follows:
CREATE QUERY Q1 AS SELECT*FROM S [RANGE <range_expression>]
This creates a continuous query Q1 with a time-based range window where the duration of the time-based window is specified as an expression "range_expression".

In one embodiment, the range_expression can be based upon one or more attributes from stream S. For example:
CREATE QUERY Q1 AS SELECT*FROM S [RANGE RANGE_COLUMN]
Here the value of attribute RANGE_COLUMN of a received event specifies the duration of the time-based range window. In this case, the value of <range_expression> is computed for each input event received via the S event stream using the value of attribute RANGE_COLUMN of the received input event. An input tuple received at a time "t" will be inserted into the time-based window and will stay in the time-based window for a duration per the value of <range_expression> and then be expired or removed from the window. The expiration time computed for a received event is thus (t+range_expression_value), where "range_expression_value" is the value computed from evaluating <range_expression> when the event is received using the value of the RANGE_COLUMN attribute of the received event. Since the values of attribute RANGE_COLUMN can vary from one event to another, the duration of the time-based window can also vary from one event to another.

The following example shows the effects of a variable duration time-based range window as events are received. For this example, it is assumed that an input event stream S has a schema (<timestamp>,<attributes>) with three attributes c1, c2, and c3: (c1 integer, c2 bigint, c3 double). A continuous CQL query may be specified for stream S as follows:
SELECT*FROM S [range c2]
Per this query, the duration for the time-based window is based upon the value of attribute c2 for each received event.

Table A below shows an input stream of tuples and the contents of a time-based range window at various time points as events are received via input event stream S.

TABLE A

Variable Duration Time-based Range Window Processing

| Input Event Stream Schema: (timestamp, c1, c2, c3) | Window Output Contents Schema: (timestamp, c1, c2, c3) |
| --- | --- |
| (1000, 10, 1, 10.0) | +(1000, 10, 1, 10.0)$^{2s}$ |
| (2000, 20, 2, 20.0) | −(1000, 10, 1, 10.0)$^{2s}$, +(2000, 20, 2, 20.0)$^{4s}$ |
| (3000, 30, 3, 30.0) | (2000, 20, 2, 20.0)$^{4s}$, +(3000, 30, 3, 30.0)$^{6s}$ |
| (4000, 40, 4, 40.0) | −(2000, 20, 2, 20.0)$^{4s}$, (3000, 30, 3, 30.0)$^{6s}$, +(4000, 40, 4, 40.0)$^{8s}$ |
| (5000, 50, 5, 50.0) | (3000, 30, 3, 30.0)$^{6s}$, (4000, 40, 4, 40.0)$^{8s}$, +(5000, 50, 5, 50.0)$^{10s}$ |
| (6000, 60, 6, 60.0) | −(3000, 30, 3, 30.0)$^{6s}$, (4000, 40, 4, 40.0)$^{8s}$, (5000, 50, 5, 50.0)$^{10s}$, +(6000, 60, 6, 60.0)$^{12s}$ |
| (7000, 70, 7, 70.0) | (4000, 40, 4, 40.0)$^{8s}$, (5000, 50, 5, 50.0)$^{10s}$, (6000, 60, 6, 60.0)$^{12s}$, +(7000, 70, 7, 70.0)$^{14s}$ |
| (8000, 80, 8, 80.0) | −(4000, 40, 4, 40.0)$^{8s}$, (5000, 50, 5, 50.0)$^{10s}$, (6000, 60, 6, 60.0)$^{12s}$, (7000, 70, 7, 70.0)$^{14s}$, +(8000, 80, 8, 80.0)$^{16s}$ |
| (9000, 90, 9, 90.0) | (5000, 50, 5, 50.0)$^{10s}$, (6000, 60, 6, 60.0)$^{12s}$, (7000, 70, 7, 70.0)$^{14s}$, (8000, 80, 8, 80.0)$^{16s}$, +(9000, 90, 9, 90.0)$^{18s}$ |
| (10000, 100, 10, 100.0) | −(5000, 50, 5, 50.0)$^{10s}$, (6000, 60, 6, 60.0)$^{12s}$, (7000, 70, 7, 70.0)$^{14s}$, (8000, 80, 8, 80.0)$^{16s}$, (9000, 90, 9, 90.0)$^{18s}$, +(10000, 100, 10, 100.0)$^{20s}$ |
| (11000, 110, 11, 110.0) | (6000, 60, 6, 60.0)$^{12s}$, (7000, 70, 7, 70.0)$^{14s}$, (8000, 80, 8, 80.0)$^{16s}$, (9000, 90, 9, 90.0)$^{18s}$, (10000, 100, 10, 100.0)$^{20s}$, +(11000, 110, 11, 110.0)$^{22s}$ |
| (12000, 120, 12, 120.0) | −(6000, 60, 6, 60.0)$^{12s}$, (7000, 70, 7, 70.0)$^{14s}$, (8000, 80, 8, 80.0)$^{16s}$, (9000, 90, 9, 90.0)$^{18s}$, (10000, 100, 10, 100.0)$^{20s}$, (11000, 110, 11, 110.0)$^{22s}$, +(12000, 120, 12, 120.0)$^{24s}$ |

In Table A shown above, the left column shows a stream of events received via stream S having schema (timestamp, c1,c2,c3). The timestamp is shown in milliseconds (msecs), where 1 second=1000 msecs. The timestamp may, for example, be the time when the event is received or when the event occurred. The right column of Table A show the contents (i.e., the events) in the time-based range window at various time points (shown in milliseconds (msecs), where 1 second=1000 msecs). A "+" notation in front of an event is used to indicate that the event is added to the time-based window. A "−" notation in front of an event is used to indicate that the event has been deleted from the time-based window due to expiration of the event.

In one embodiment, upon receiving an event, an expiration time is calculated for the event. The expiration time computed for an event indicates the time when the event expires and is to be deleted from the time-based window. The event is then added to the time-based window. The time-based window is also checked to determine if any events in the window have expired and need to be removed from the window.

For an event arriving at time "t" and having a time range or duration "T", the expiration time for the event is (t+T). For the query
SELECT*FROM S [range c2],
the range value is based upon the value of attribute c2 in the received event. Accordingly, for a received event with an associated timestamp "t", the expiration time for the event is (t+value of c2). In Table A above, the expiration time for each received event is shown as a superscript for the event (e.g., (timestamp,c1,c2,c3)$^{Expiration\_time}$). In certain embodiments, unless specifically specified by the range clause, by default, the range time unit is a second, so S[range 1] is equivalent to S[range 1 second].

It is assumed that the time-based window (i.e., the relation set output by the time-based window) is empty before the arrival of the event at 1000 msecs, i.e., before the arrival of the event with associated timestamp 1000 msecs. As shown in Table A, event (1000,10,1,10.0) is received first. The expiration time for the event is computed to be 2 seconds (timestamp of event+value of c2, i.e., 1+1=2 seconds). The event is then added (denoted by the "+") to the time-based window. Event (1000,10,1,10.0) is to stay in the time-based window for 1 second and is to be deleted from the window at the 2 second mark. At this point the time-based range window comprises one event (1000,10,1,10.0).

An event (2000,20,2,20.0) is received next. In one embodiment, a timestamp of 2000 msecs may denote the time the event was received. The contents of the time-based window are checked to see if any events in the window have expired. It is determined that event (1000,10,1,10.0) has expired and is deleted (denoted by the "−") from the time-based window. An expiration time for event (2000,20, 2,20.0) is computed to be 4 seconds (timestamp of event+ value of c2, i.e., 2+2=4 seconds). The event is then added to the time-based window. The event is to stay in the window for 2 seconds and is to be deleted from the window at the 4 second mark. At this time point the time-based range window comprises one event (2000,20,2,20.0).

An event (3000,30,3,30.0) is received next. The contents of the time-based window are checked to see if any events in the window have expired and it is determined that none have expired. The expiration time for event (3000,30,3,30.0) is computed to be 6 seconds (timestamp of event+value of c2, i.e., 3+3=6 seconds). The event is added to the time-based window. The event is to stay in the window for 3 seconds and is to be deleted from the window at the 6 second mark. At this time point the time-based range window comprises two events (2000,20,2,20.0) and newly added event (3000,30,3,30.0).

An event (4000,40,4,40.0) is received next. The contents of the time-based window are checked to see if any events in the window have expired. It is determined that event (2000,20,2,20.0) has expired and is deleted (denoted by the "−") from the time-based window. An expiration time for event (4000,40,4,40.0) is computed to be 8 seconds (timestamp of event+value of c2, i.e., 4+4=8 seconds). The event is then added to the time-based window. The event is to stay in the window for 4 seconds and is to be deleted from the window at the 8 second mark. At this time point the time-based range window comprises two events (3000,30, 3,30.0) and newly added event (4000,40,4,40.0).

An event (5000,50,5,50.0) is received next. The contents of the time-based window are checked to see if any events in the window have expired and it is determined that none have expired. The expiration time for event (5000,50,5,50.0) is computed to be 10 seconds (timestamp of event+value of c2, i.e., 5+5=10 seconds). The event is then added to the time-based window. The event is to stay in the window for 5 seconds and is to be deleted from the window at the 10 second mark. At this time point the time-based range window comprises three events (3000,30,3,30.0), (4000,40,4, 40.0), and newly added event (5000,50,5,50.0).

An event (6000,60,6,60.0) is received next. The contents of the time-based window are checked to see if any events in the window have expired and it is determined that event (3000,30,3,30.0) has expired and is deleted (denoted by the "−") from the time-based window. An expiration time for event (6000,60,6,60.0) is computed to be 12 seconds (timestamp of event+value of c2, i.e., 6+6=12 seconds). The event is then added to the time-based window. The event is to stay in the window for 6 seconds and is to be deleted from the window at the 12 second mark. At this time point the time-based range window comprises three events (4000,40, 4,40.0), (5000,50,5,50.0), and newly added event (6000,60, 6,60.0).

An event (7000,70,7,70.0) is received next. The contents of the time-based window are checked to see if any events in the window have expired and it is determined that none have expired. An expiration time for event (7000,70,7,70.0) is computed to be 14 seconds (arrival time of event+value of c2, i.e., 7+7=14 seconds). The event is then added to the time-based window. The event is to stay in the window for 7 seconds and is to be deleted from the window at the 14 second mark. At this time point the time-based range window comprises four events (4000,40,4,40.0), (5000,50,5, 50.0), (6000,60,6,60.0), and newly added event (7000,70,7, 70.0).

An event (8000,80,8,80.0) is received next. The contents of the time-based window are checked to see if any events in the window have expired and it is determined that event (4000,40,4,40.0) has expired and is deleted (denoted by the "−") from the time-based window. An expiration time for event (8000,80,8,80.0) is computed to be 16 seconds (timestamp of event+value of c2, i.e., 8+8=16 seconds). The event is then added to the time-based window. The event is to stay in the window for 8 seconds and is to be deleted from the window at the 16 second mark. At this time point the time-based range window comprises four events (5000,50, 5,50.0), (6000,60,6,60.0), (7000,70,7,70.0), and newly added event (8000,80,8,80.0).

An event (9000,90,9,90.0) is received next. The contents of the time-based window are checked to see if any events in the window have expired and it is determined that none have expired. An expiration time for event (9000,90,9,90.0) is computed to be 18 seconds (arrival time of event+value of c2, i.e., 9+9=18 seconds). The event is added to the time-based window. The event is to stay in the window for 9 seconds and is to be deleted from the window at the 18 second mark. At this time point the time-based range window comprises five events (5000,50,5,50.0), (6000,60,6, 60.0), (7000,70,7,70.0), (8000,80,8,80.0), and newly added event (9000,90,9,90.0).

An event (10000,100,10,100.0) is received next. The contents of the time-based window are checked to see if any events in the window have expired and it is determined that event (5000,50,5,50.0) has expired and is deleted (denoted by the "−") from the time-based window. An expiration time for event (10000,100,10,100.0) is computed to be 20 seconds (timestamp of event+value of c2, i.e., 10+10=20 seconds). The event is added to the time-based window. The event is to stay in the window for 10 seconds and is to be deleted from the window at the 20 second mark. At this time point the time-based range window comprises five events (6000,60,6,60.0), (7000,70,7,70.0), (8000,80,8,80.0), (9000, 90,9,90.0), and newly added event (10000,100,10,100.0).

An event (11000,110,11,110.0) is received next. The contents of the time-based window are checked to see if any events in the window have expired and it is determined that none have expired. An expiration time for event (11000,110, 11,110.0) is computed to be 22 seconds (timestamp of event+value of c2, i.e., 11+11=22 seconds). The event is added to the time-based window. The event is to stay in the window for 11 seconds and is to be deleted from the window at the 22 second mark. At this time point the time-based range window comprises six events (6000,60,6,60.0), (7000, 70,7,70.0), (8000,80,8,80.0), (9000,90,9,90.0), (10000,100, 10,100.0), and newly added event (11000,110,11,110.0).

An event (12000,120,12,12.0) is received next. The contents of the time-based window are checked to see if any events in the window have expired it is determined that event (6000,60,6,60.0) has expired and is deleted (denoted by the "−") from the relationship output by the window. An expiration time for event (12000,120,12,120.0) is computed to be 24 seconds (arrival time of event+value of c2, i.e., 12+12=24 seconds). The event is then added to the time-based window. The event is to stay in the window for 12 seconds and is to be deleted from the window at the 24 second mark At this time point the time-based range window comprises six events (7000,70,7,70.0), (8000,80,8,80.0), (9000,90,9,90.0), (10000,100,10,100.0), (11000,110,11, 110.0), and newly added event (12000,120,12,120.0).

As described above with respect to Table A, the processing that is performed upon receiving an input event comprises determining an expiration time for the input event, adding the input event to the time-based window, and checking the window to identify and delete any expired events. The duration of time that an event stays in the time-based window can be a function of an attribute of the input event. Since the value of that attribute can be different in different events, the duration of time that the event stays in the time-based window can differ from one event to another. Accordingly, the durations of time that events are eligible to remain in the time-based window can be different for different events.

Figure 2:
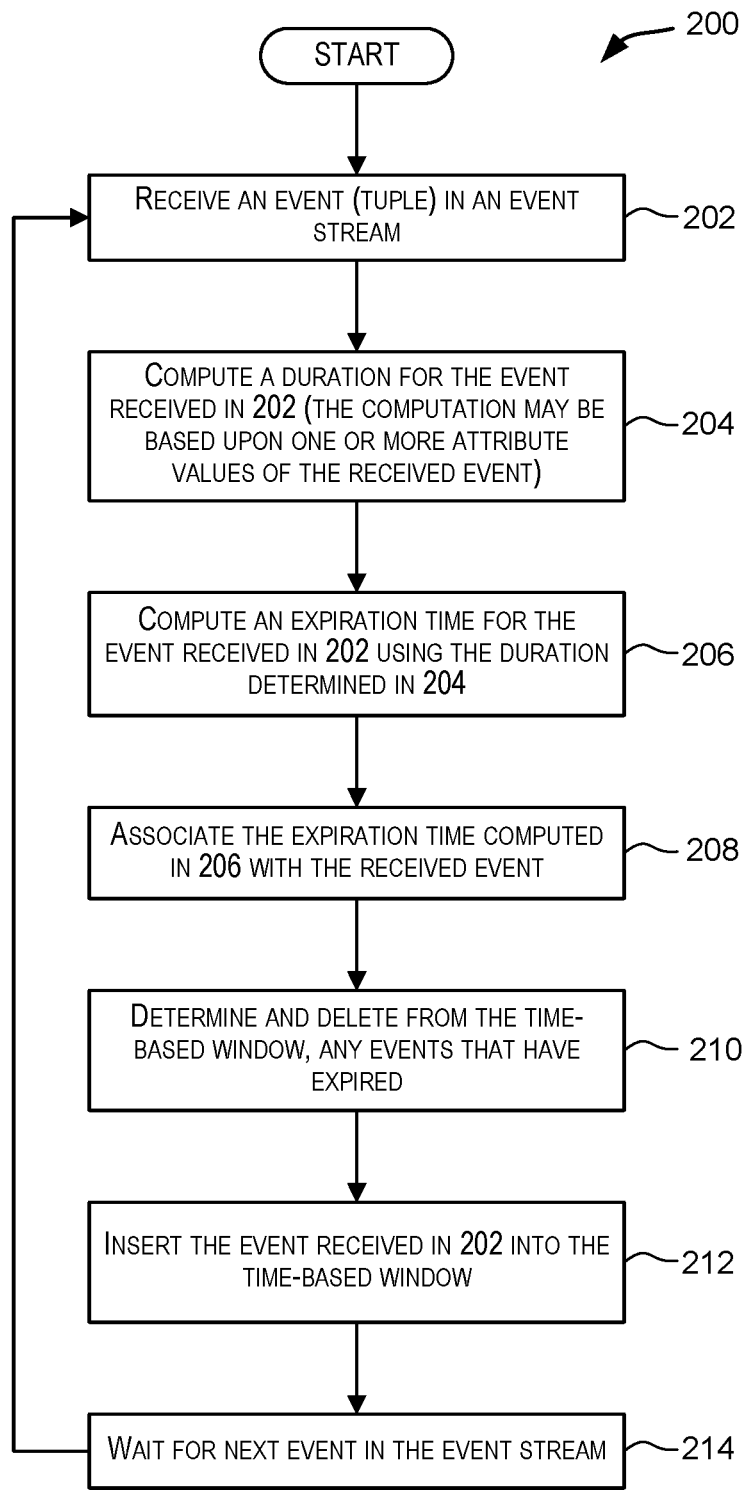
FIG. 2 depicts a simplified flowchart depicting a method for managing variable duration windows according to an embodiment of the present invention.

FIG. 2 depicts a simplified flowchart 200 depicting a method for managing variable duration windows according to an embodiment of the present invention. The processing depicted in FIG. 2 may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 2 is not intended to be limiting.

In certain embodiments, the processing depicted in FIG. 2 may be performed as part of the continuous query execution each time that an input event is received via an event stream. At 202, an input event (tuple) may be received in an event stream. The event may have associated time information (e.g., a timestamp). In some instances, the time associated with an event may represent the time when the event was received.

At 204, a duration of time for which the event is to be kept in the time-based window is computed for the received event. As part of 204, the range parameter specified for the time-based window by the CQL code is determined and used to determine the duration. As previously described, in some embodiments, the continuous query may define the duration for a time-based window as a function of the values of one or more attributes of the received input event. In such a scenario, determining the duration in 204 may involve determining the values of one or more attributes of the event received in 202 and computing the duration for that event as a function of those values. Since the values of the one or more attributes used for computing the duration could be different for different events, this causes the duration to potentially vary for individual events.

For example, in certain embodiments, the duration may be set to the value of a particular attribute of the event. The value of that particular attribute may be determined in 204 and the window duration for the input event set to the determined value. In some other embodiments, the continuous query may define the duration for a window as an arithmetic expression based upon one or more attribute values. In such a scenario, in 204, the one or more attribute values for the received event may be determined and arithmetic expression then evaluated using the determined values to compute a duration for the received event.

At 206, an expiration time is computed for the received event based upon the duration determined in 204. In one embodiment, Expiration time for an event=t+T where, "t" is the time associated with the event received in 202 (e.g., the arrival time of the event) and "T" is the duration determined in 204.

At 208, the expiration time computed in 206 may be associated with the event received in 202. For example, the expiration time information may be stored such that EPS 102 can, given an event, easily determine the expiration time computed for the event.

At 210, the time-based window is checked to see if it contains any events (i.e., previously received events) that have expired. For any event identified as having expired, the event is deleted or removed from the time-based window in 210. In one embodiment, an event in the time-based window is considered to have expired if the expiration time computed for the event is equal to or earlier than the present time. As described above, the expiration time for an event is computed as (t+T). Accordingly, the event is considered to have expired if the current time ($t_P$) is same as or later than (t+T). Any event determined to have expired is then deleted or removed from the time-based window in 210.

At 212, the event received in 202 is inserted or added to the time-based window. At 214, the processing then waits for the next event in the event stream. Upon receiving the next event, processing is repeated from 202 to 214.

As described above with respect to FIG. 2, a duration and expiration time are computed for each received event and the event then inserted into the time-based window. Further, any existing events in the time-based window are also checked to identify any expired events and these expired events are then deleted or removed from the time-based window. In this manner, a duration of time for which an event is to remain in the time-based window is computed for each event, where the duration may be based upon one or more attribute values of the event. The expiration time computed for the event based upon the duration represents the time when the event has expired and is to be deleted or removed from the time-based window.

Figure 3:
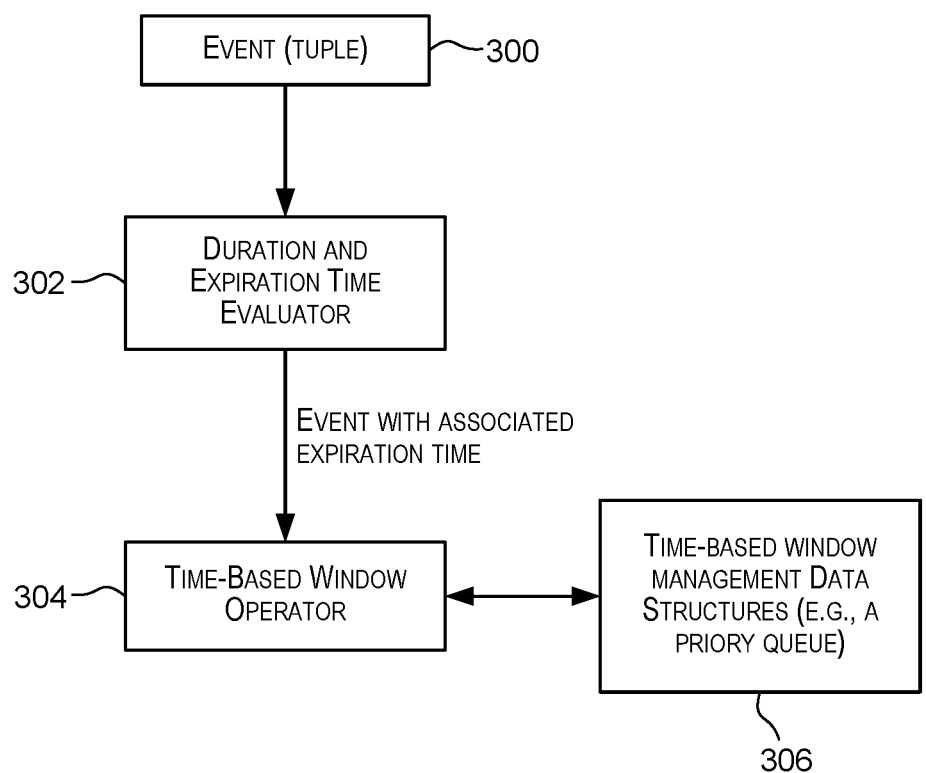
FIG. 3 depicts modules and data structures that may be used to implement variable duration time-based windows processing according to an embodiment of the present invention.

FIG. 3 depicts modules and data structures that may be used to implement variable duration time-based windows processing according to an embodiment of the present invention. The modules depicted in FIG. 3 may be implemented in software or hardware, or combinations thereof. Further, the modules and data structures depicted in FIG. 3 are not intended to be limiting. Alternative embodiments may have more or less modules than those shown in FIG. 3 in various arrangements and combinations.

In the embodiment depicted in FIG. 3, the modules include a duration and expiration time evaluator module 302 and a time-based window operator module 304. Duration and expiration time evaluator module 302 may be configured to, for each newly received event, determine the duration and expiration time for the received event. The received event along with the expiration time computed for the event may then be handed over to time-based window operator 304 for further processing. In one embodiment, duration and expiration time evaluator 302 may be configured to perform the processing depicted in 204, 206, and 208 of FIG. 2 and described above.

Time-based window operator 304 may be configured to manage a time-based window. This may involve inserting a newly received event into the time-based window, determining when events in the time-based window have expired, and deleting or removing the expired events from the time-based window. In one embodiment, time-based window operator 304 may be configured to perform the processing depicted in 210 and 212 and described above.

Various data structures may be used to implement a variable duration time-based window. In one embodiment, a priority queue is used, where the priority is dictated by the expiration time computed for the events in the window. Newly received events are added to the queue and expired events are deleted from the queue. The events in the queue may be sorted based upon their associated expiration times. In one embodiment, the events are sorted such that events having earlier expiration times are closer to the head of the queue and events having later expiration times are towards the tail of the queue. At any time instance, the priority queue may comprise zero or more events representing the zero or more events in the time-based window at that time instance.

Figure 4:
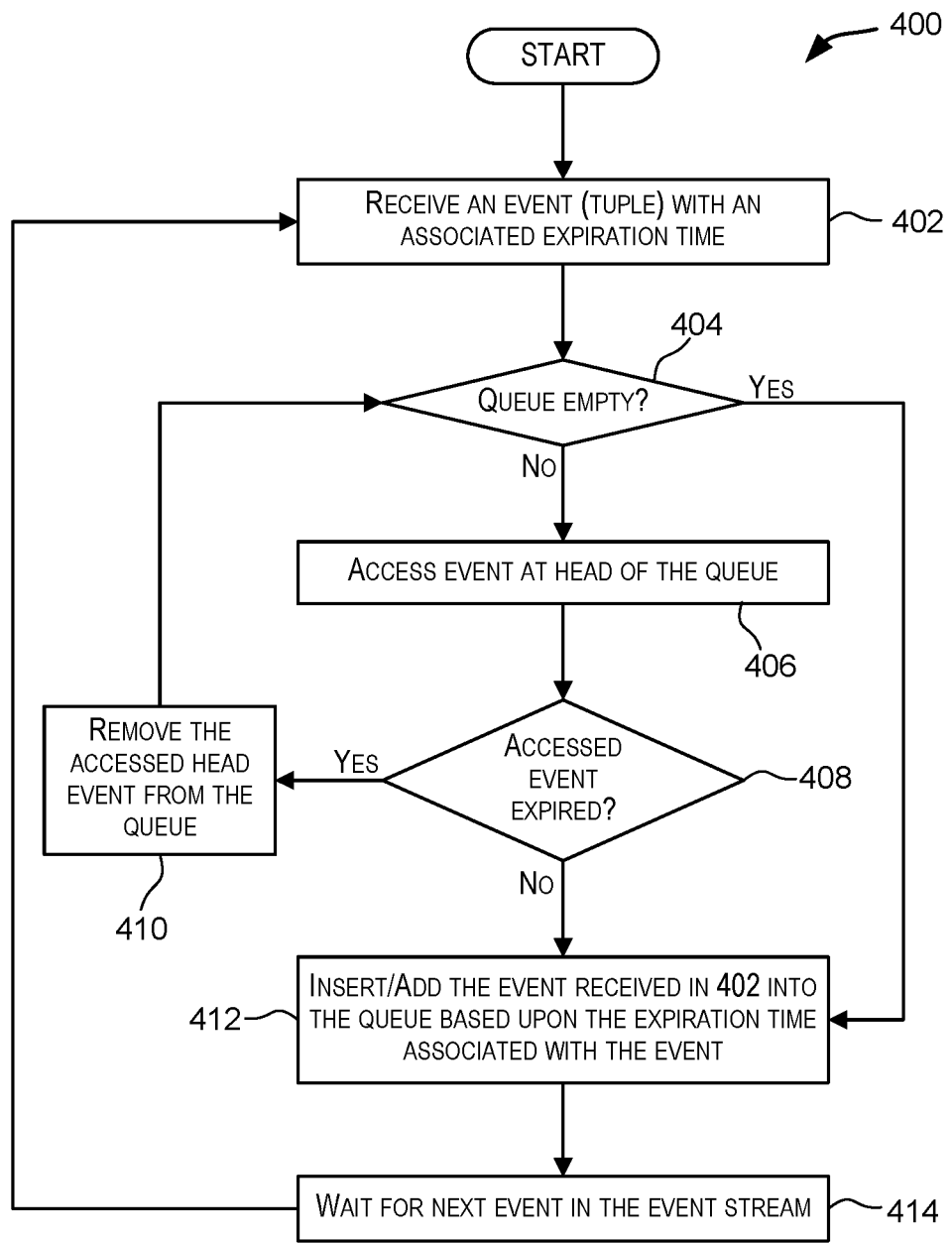
FIG. 4 depicts a simplified flowchart depicting processing that may be performed by a time-based window operator in embodiments where a priority queue, as described above, is used to implement a variable duration time-based window.

FIG. 4 depicts a simplified flowchart 400 depicting processing that may be performed by a time-based window operator in embodiments where a priority queue, as described above, is used to implement a variable duration time-based window. The processing depicted in FIG. 4 may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 4 is not intended to be limiting.

At 402, a newly received event with an associated expiration time may be received. The expiration time for the event may have been calculated by duration and expiration time evaluator 302.

At 404, a determination is made if the queue is empty. An empty queue indicates that there are presently no events in the window. If it is determined in 404 that the queue is empty, then processing continues with 412 else processing continues with 406.

At 406, the event at the head of the priority queue is accessed. Since event elements in the priority queue are always sorted based upon the expiration times associated with the events, with events having earlier expiration times being closer to the head of the queue and events having later expiration times being towards the tail of the queue, the event at the head of the queue represents an event in the window with the earliest expiration time.

At 408, it is determined whether the event accessed in 406 has expired. In one embodiment, the event is considered expired if the expiration time associated with the accessed event is equal to or earlier than the current time. For example, if the current time is at the 10 second mark, the accessed event is considered expired if the expiration time associated with the accessed event is 10 seconds or less than 10 seconds. If it is determined in 408 that the accessed event has expired, then at 410, the accessed event is removed or deleted from the priority queue and processing then continues with 404. If it is determined in 408 that the accessed event has not expired, then processing continues with 412. In this manner, the processing in 404, 406, 408, and 410 is repeated until all expired events in the queue have been removed from the queue or until the queue is empty.

If it is determined in 404 that the queue is empty or in 406 that the accessed event has not expired, then processing continues with 412. At 412, the event received in 402 is added to the queue based upon the expiration time computed for the event. The event is inserted in a manner that maintains the sorted nature of the queue (i.e., sorted based upon the expiration times). Processing then continues with 414 wherein EPS 102 waits for the next event in the event stream. Upon an event, processing continues with 402.

Time-Based Partition Window

In certain embodiments, a "PARTITION BY" CQL clause enables an event stream to be logically partitioned into multiple substreams based upon the stream's attributes. A sliding window of range T is then independently computed on each substream.

For example, a time-based partition window may be defined for a stream S as follows:

S [partition by A1, . . . , Ak rows N range T]

The above-partitioned sliding window on a stream S takes a positive integer number of events N and a subset {A1, . . . Ak} of the stream's attributes as parameters and (1) logically partitions S into different substreams based on equality of attributes A1, . . . Ak, and (2) computes an event-based sliding window of size N and range/duration T independently on each substream. The event-based sliding window is applied independently to each partition. Such a window may be referred to as a "row-time range window" since, for a window on a partition, events are expired from the window either based upon their associated expiration times controlled by "range T" or based upon the number of events in the window controlled by "rows N", where N defines the maximum number of events in the row-time range window.

In previous implementations, the range/duration parameter "T" was constant or fixed and was not variable. Certain embodiments of the present invention, allow the range/duration parameter T specifying the time duration that an event is eligible to remain in the row-time range window for a partition created by a PARTITION BY clause to be different for different events. As a result, for a query registered with EPS 102 for a particular input event stream, the duration of time that events remain in a window for a partition can be different for different events.

For example, consider the following CQL query having a variable duration partition window:
CREATE QUERY Q1 AS
SELECT*
FROM S [PARTITION BY DATA ROWS M RANGE
   <range_expression>]

The above CQL code partitions the stream S into partitions or substreams based upon the value of "DATA". For each partition, the CQL code specifies a row-time range window, where the maximum number of events in the row-time range window is "M" and the duration of time that an event is eligible to remain in the row-time range window is expressed by <range_expression>. In this example, the parameter for "range" is specified as an expression "<range_expression>", where range_expression can be a variable or an arithmetic expression. In some embodiments, <range_expression> may be based upon an event attribute. In certain other embodiments, <range_expression> may be an arithmetic expression, which may be based upon one or more attributes of the event stream schema.

For example, consider the following:
FROM S [PARTITION BY DATA ROWS 2 RANGE
   RANGE_COLUMN]

Here again, the event stream S is partitioned based upon the value of attribute "DATA". The CQL code specifies a row-time range window for each partition, where the maximum number of events in a window for a partition is 2 and the duration of time that an event is eligible to remain in the window is expressed by RANGE_COLUMN, which is an event attribute. For an event belonging to a particular partition, the duration of time that the event is eligible to remain in the row-time range window for the partition is controlled by the value of attribute RANGE_COLUMN of the event and by the number of events (maximum of 2) in the partition window. Accordingly, events with different values of attribute RANGE_COLUMN will be eligible to remain in the window for different durations.

In the following example, the partition time-based duration parameter is expressed as an arithmetic expression.
CREATE QUERY Q1 AS
SELECT*FROM S [PARTITION BY DATA ROWS 2
   RANGE <range_expression>]]

Here, the event stream S is partitioned based upon the value of attribute "DATA". The CQL code specifies a row-time range window for each partition, where the maximum number of events in a window is 2 and the duration of time that an event is eligible to remain in the window is expressed by an expression <range_expression>. This row-time range window is applied independently to each partition. The expiration time computed for a received event for a partition is thus (t+range_expression_value), where "range_expression_value" is the value computed from evaluating <range_expression> when the event is received.

The following example shows the effects of a variable duration time-based range window applied to different partitions as events are received. For this example, it is assumed that an input event stream S has a schema with two attributes c1 and c2:

S (c1 character(2), c2 bigint)

A continuous CQL query may be specified for stream S as follows:
SELECT*from S [PARTITION BY c1 ROWS 2 RANGE
   c2]

Per the above CQL code, input stream S is partitioned based upon the value of attribute c1. The CQL code specifies a row-time range window for each partition, where the maximum number of events in a window for a partition is 2 (due to "ROWS 2") and the duration of time that an event is eligible to remain in the window for the partition is determined by the value of attribute c2 of the event (due to "RANGE c2").

Table B below shows an input stream of tuples and the contents of a tuple and row-time range window applied to multiple partitions at various times points as events are received via input event stream S.

TABLE B

Variable Duration Time-based Range Window with Partition Processing

| Input Event Stream<br>Schema: (timestamp, c1, c2) | Row-time range Window Contents<br>Schema: (timestamp, c1, c2) |
|---|---|
| (1000, a, 2) | Pa: +(1000, a, 2)$^{3s}$ |
| (1000, a, 9) | Pa: (1000, a, 2)$^{3s}$, +(1000, a, 9)$^{10s}$ |
| (2000, a, 1) | Pa: −(1000, a, 2)$^{3s}$, (1000, a, 9)$^{10s}$,<br>+(2000, a, 1)$^{3s}$ |
| (3000, b, 1) | Pa: −(2000, a, 1)$^{3s}$, (1000, a, 9)$^{10s}$,<br>Pb: +(3000, b, 1)$^{4s}$ |
| (4000, a, 2) | Pa: (1000, a, 9)$^{10s}$, +(4000, a, 2)$^{6s}$, |
| (4000, a, 3) | Pa: −(1000, a, 9)$^{10s}$, (4000, a, 2)$^{6s}$,<br>+(4000, a, 3)$^{7s}$ |
| (4000, b, 3) | Pb: −(3000, b, 1)$^{4s}$, +(4000, b, 3)$^{7s}$ |
| (5000, b, 2) | Pa: (4000, a, 2)$^{6s}$, (4000, a, 3)$^{7s}$<br>Pb: (4000, b, 3)$^{7s}$, +(5000, b, 2)$^{7s}$ |
| (6000, <heartbeat event>) | Pa: −(4000, a, 2)$^{6s}$, (4000, a, 3)$^{7s}$<br>Pb: (4000, b, 3)$^{7s}$, (5000, b, 2)$^{7s}$ |
| (7000, c, 1) | Pa: −(4000, a, 3)$^{7s}$<br>Pb: −(4000, b, 3)$^{7s}$, −(5000, b, 2)$^{7s}$<br>Pc: +(7000, c, 1)$^{8s}$ |
| (8000, <heartbeat event>) | Pa:<br>Pb:<br>Pc: −(7000, c, 1)$^{8s}$ |

In Table B shown above, the left column shows a stream of events received via stream S having schema (timestamp, c1,c2). The timestamp is shown in milliseconds (msecs), where 1 second=1000 msecs. In one embodiment, the timestamp associated with an event may represent the time when the event is received or when the event occurred. The right column of Table B shows, for each partition, the contents (i.e., the events) in the row-time range window for the partition at various time points. A "+" notation in front of an event is used to indicate that the event is added to the row-time range window for a partition. A "−" notation in front of an event is used to indicate that the event has been deleted from the row-time range window for the partition due to expiration of the event.

In one embodiment, upon receiving an event, a partition for the event is determined. An expiration time is calculated for the event. The expiration time computed for an event indicates the time when the event expires and is to be deleted from the row-time range window for the partition. The event is then added to the row-time range window for the appropriate partition. The row-time range window for each partition is also checked to determine if any events in the row-time range window need to be removed from the window either due to the expiration of the event or due to the ROWs condition.

For an event having an associated timestamp "t" and having a time range or duration "T", the expiration time for the event is (t+T). For the query SELECT*from S [PARTITION BY c1 ROWS 2 RANGE c2]

the range value is based upon the value of attribute c2 in the received event. Accordingly, for a received event, the expiration time for the event is (t+value of c2). In Table B above, the expiration time for each received event is shown as a superscript for the event (e.g., (timestamp,c1,c2)$^{Expiration\_time}$).

As shown in Table B, an event (1000,a,2) is received. The row-time range windows (i.e., the relation sets output by the window for each partition) for the various partitions are checked to determine if any events need to be deleted from the row-time range windows due to expiration of the events. For purposes of the example depicted in Table B, it is assumed that the row-time range windows for the various partitions are empty before the arrival of the event (1000, a,2). It is determined based upon the event's c2 attribute value that the event is to stay in the row-time range window for a partition corresponding to attribute value "a" ("Pa") for 2 seconds. The expiration time for event (1000,a,2) is computed to be the 3 second mark (timestamp of the event+value of c2, i.e., 1+2=3 seconds). The event (1000, a,2) is then added (denoted by the "+") to the row-time range window for Pa. Event (1000,a,2) is eligible to stay in the row-time range window for partition Pa for 2 seconds. The event is to be deleted from the row-time range window at the 3 second mark (or earlier due to the "ROWS 2" condition for the partition window). The row-time range window for Pa is then checked to determine if any events need to be deleted from the row-time range window due to the "ROWS 2" condition. It is determined that no event needs to be deleted.

An event (1000,a,9) is received having the same associated timestamp information. It is determined based upon the event's c2 attribute value that the event is to stay in the row-time range window for Pa for 9 seconds. The expiration time for the event is computed to be the 10 second mark (timestamp of the event+value of c2, i.e., 1+9=10 seconds). The event (1000,a,9) is then added (denoted by the "+") to the row-time range window for partition Pa. Event (1000, a,9) is eligible to stay in the row-time range window for partition Pa for 9 seconds. The event is to be deleted from the row-time range window at the 10 second mark (or earlier due to the "ROWS 2" condition for the partition window). The row-time range window for Pa is checked to determine if any event needs to be deleted from the row-time range window due to the insertion of event (1000,a,9) to satisfy the "ROWS 2" condition. It is determined that no events need to be deleted. At this point the row-time range window for partition Pa comprises two events (1000,a,2) and (1000,a,9).

An event (2000,a,1) is received next. The row-time range windows for the various partitions are checked to determine if any events need to be deleted from the row-time range windows due to expiration of the event. It is determined that no events are expired. It is determined based upon the event's c2 attribute value that the event is to stay in the row-time range window for Pa for 1 second. The expiration time for event (a,1) is computed to be the 3 second mark (timestamp of the event+value of c2, i.e., 2+1=3 seconds). The event (2000,a,1) is then added (denoted by the "+") to the row-time range window for partition Pa. Event (2000, a,1) is eligible to stay in the row-time range window for partition Pa for 1 second. The event is to be deleted from the row-time range window at the 3 second mark (or earlier due to the "ROWS 2" condition for the partition window). The row-time range window for Pa is then checked to determine if any events need to be deleted from the row-time range window for Pa due to insertion of event (2000,a,1) to satisfy the "ROWS 2" condition. Due to the "ROWS 2" condition for the row-time range window for Pa, the addition of event (2000,a,1) causes event (1000,a,2) to be deleted (denoted by the "−") from the row-time range window for partition Pa, leaving two events (1000,a,9) and (2000,a,1) in the row-time range window for partition Pa.

An event (3000,b,1) is received next. The row-time range windows for the various partitions are checked to determine if any event needs to be deleted from the row-time range windows due to expiration of the event. It is determined that event (2000,a,1) in the row-time range window for partition Pa has expired and is deleted (denoted by the "−") from the window. It is determined, based upon the value of the c2 attribute, that event (3000,b,1) is to stay in the row-time range window for a partition corresponding to attribute value "b" ("Pb") for 1 second. The expiration time for event (3000,b,1) is computed to be the 4 second mark (timestamp of the event+value of c2, i.e., 3+1=4 seconds). The event (3000,b,1) is then added (denoted by the "+") to the row-time range window for Pb. Event (3000,b,1) is eligible to stay in the window for partition Pb for 1 second. The event is to be deleted from the row-time range window at the 4 second mark (or earlier due to the "ROWS 2" condition for the partition window). The row-time range window for Pb is checked to determine if any event needs to be deleted from the row-time range window due to the insertion of event (3000,b,1) to satisfy the "ROWS 2" condition. It is determined that no events need to be deleted. At this point the row-time range window for partition Pa comprises event (1000,a,9) and the row-time range window for partition Pb comprises event (3000,b,1).

Three events (4000,a,2), (4000,a,3) and (4000,b,3) are received next with the same associated timestamp. The row-time range windows for the various partitions are checked to determine if any event needs to be deleted from the row-time range windows due to expiration of the event. It is determined that event (3000,b, 1) in the row-time range window for Pb has expired and is deleted (denoted by the "−") from the window. It is determined, based upon the value of the c2 attribute, that event (4000,a,2) is to stay in the row-time range window for Pa for 2 seconds. The expiration time for event (4000,a,2) is computed to be the 6 second mark (timestamp of the event+value of c2, i.e., 4+2=6 seconds). The event (4000,a,2) is then added (denoted by the "+") to the row-time range window for partition Pa. Event (a,2) is eligible to stay in the row-time range window for partition Pa for 2 seconds and is to be deleted from the window at the 6 second mark (or earlier due to the "ROWS 2" condition for the partition window). The row-time range window for Pa is checked to determine if any event needs to be deleted from the row-time range window due to the insertion of event (4000,a,2) to satisfy the "ROWS 2" condition. It is determined that no events need to be deleted.

For event (4000,a,3), it is determined, based upon the value of the c2 attribute, that event (4000,a,3) is to stay in the row-time range window for Pa for 3 seconds. The expiration time for event (4000,a,3) is computed to be the 7 second mark (timestamp of the event+value of c2, i.e., 4+3=7 seconds). The event (4000,a,3) is then added (denoted by the "+") to the row-time range window for partition Pa. Event (4000,a,3) is eligible to stay in the row-time range window for partition Pa for 3 seconds and is to be deleted from the window at the 7 second mark (or earlier due to the "ROWS 2" condition for the partition window). The row-time range window for Pa is then checked to determine if any events need to be deleted from the row-time range window for Pa due to insertion of event (4000,a,3) to satisfy the "ROWS 2" condition. The addition of event (4000,a,3) causes event (1000,a,9) to be deleted (denoted by the "−") from the row-time range window for partition Pa.

For event (4000,b,3), it is determined, based upon the value of the c2 attribute, that event (4000,b,3) is to stay in the row-time range window for partition Pb for 3 seconds. The expiration time for event (4000,b,3) is computed to be the 7 second mark (timestamp of the event+value of c2, i.e., 4+3=7 seconds). The event (4000,b,3) is then added (denoted by the "+") to the row-time range window for partition Pb. Event (b,3) is eligible to stay in the row-time range window for partition Pb for 3 seconds and is to be deleted from the window at the 7 second mark (or earlier due to the "ROWS 2" condition for the partition window). The row-time range window for partition Pb is checked to determine if any event needs to be deleted from the row-time range window due to the insertion of event (4000,b,3) to satisfy the "ROWS 2" condition. It is determined that no events need to be deleted. At this point, the row-time range window for partition Pa comprises events (4000,a,2) and (4000,a,3), and the window for partition Pb comprises event (4000,b,3).

An event (5000,b,2) is received next. The row-time range windows for the various partitions are checked to determine if any event needs to be deleted from the row-time range windows due to expiration of the event. It is determined that no events are expired. It is determined, based upon the value of the c2 attribute, that event (5000,b,2) is to stay in the row-time range window for partition Pb for 2 seconds. The expiration time for event (5000,b,2) is computed to be the 7 second mark (timestamp of the event+value of c2, i.e., 5+2=7 seconds). The event (5000,b,2) is then added (denoted by the "+") to the row-time range window for partition Pb. Event (5000,b,2) is eligible to stay in the row-time range window for partition Pb for 2 seconds and is to be deleted from the window at the 7 second mark (or earlier due to the "ROWS 2" condition for the partition window). The row-time range window for partition Pb is checked to determine if any event needs to be deleted from the row-time range window due to the insertion of event (5000,b,2) to satisfy the "ROWS 2" condition. It is determined that no events need to be deleted. At this point, the row-time range window for partition Pa comprises events (4000,a,2) and (4000,a,3), and the row-time range window for partition Pb comprises events (4000,b,3) and (5000,b,2).

A heartbeat event is received next having an associated 6000 msec timestamp. In one embodiment, a heartbeat event is a special type of input event that is used to convey just the time progress information. A heartbeat event does not have any value for the other attributes. An event processing system may be configured to send heartbeat events automatically at periodic intervals, which can be configured by a user of the system. Heartbeat events are then automatically generated and sent at the periodic intervals if no other actual event is received within that period (i.e., the event stream is silent for that time period). Upon receiving the heartbeat event, windows-related processing is performed. Accordingly, upon receiving heartbeat event (6000, heartbeat_event>), the row-time range windows for the various partitions are checked to determine if any event needs to be deleted from the row-time range windows due to expiration of the event. It is determined that event (4000,a,2) in the row-time range window for partition Pa has expired and is deleted (denoted by the "−") from the window. At this point, the row-time range window for partition Pa comprises event (4000,a,3), and the row-time range window for partition Pb comprises events (4000,b,3) and (5000,b,2).

An event (7000,c,1) is received next. The row-time range windows for the various partitions are checked to determine if any event needs to be deleted from the row-time range windows due to expiration of the event. It is determined that event (4000,a,3) in the row-time range window for partition Pa and events (4000,b,3) and (5000,b,2) in the row-time range window for partition Pb have expired and are deleted (denoted by the "−") from the window. It is determined based upon the received event's c2 attribute value that event (7000,c, 1) is to stay in the row-time range window for a partition corresponding to attribute value "c" ("Pc") for 1 second. The expiration time for event (7000,c,1) is computed to be the 8 second mark (timestamp of the event+value of c2, i.e., 7+1=8 seconds). The event (7000,c,1) is then added (denoted by the "+") to the row-time range window for partition Pc corresponding to attribute value "c". Event (7000,c, 1) is eligible to stay in the row-time range window for partition Pc for 1 second and is to be deleted from the window at the 8 second mark (or earlier due to the "ROWS 2" condition for the partition window). The row-time range window for partition Pc is checked to determine if any event needs to be deleted from the row-time range window due to the insertion of event (7000,c,1) to satisfy the "ROWS 2" condition. It is determined that no events need to be deleted. At this point, the row-time range windows for partitions Pa and Pb are empty and the row-time range window for partition Pc comprises event (7000,c, 1).

It is to be noted that not all systems need to have a heartbeat event sending mechanism. In a system not sending out heartbeat events, windows-related processing is performed upon receiving a regular input event via the event stream. For example, for the event stream depicted in Table B, for a system that does not have a heartbeat event sending capability, the processing performed at the 6000 msecs mark and the 7000 msecs mark may be performed at the 7000 msec mark when a new event (7000,c,1) is received.

A heartbeat event (8000,<heartbeat_event>) is received next. The row-time range windows for the various partitions are checked to determine if any event needs to be deleted from the row-time range windows due to expiration of the event. It is determined that event (7000,c, 1) in the row-time range window for partition Pc has expired and is deleted (denoted by the "−") from the window. At this point, the row-time range windows for partitions Pa, Pb, and Pc are empty.

As described above with respect to Table B, the processing that is performed upon receiving an input event comprises determining an expiration time for the input event, determining a partition to which the event belongs, adding the input event to the row-time range window for that partition, and checking the row-time range windows for the various partitions to identify and delete any expired events or events that need to be removed from the partition window as a result of the ROWS conditions. The duration of time that an event stays in the row-time range window for a partition can be a function of an attribute of the input event, which can be different for different input events. Accordingly, the durations of time that events are eligible to remain in a row-time range window for a partition can be different for different events.

Figure 5:
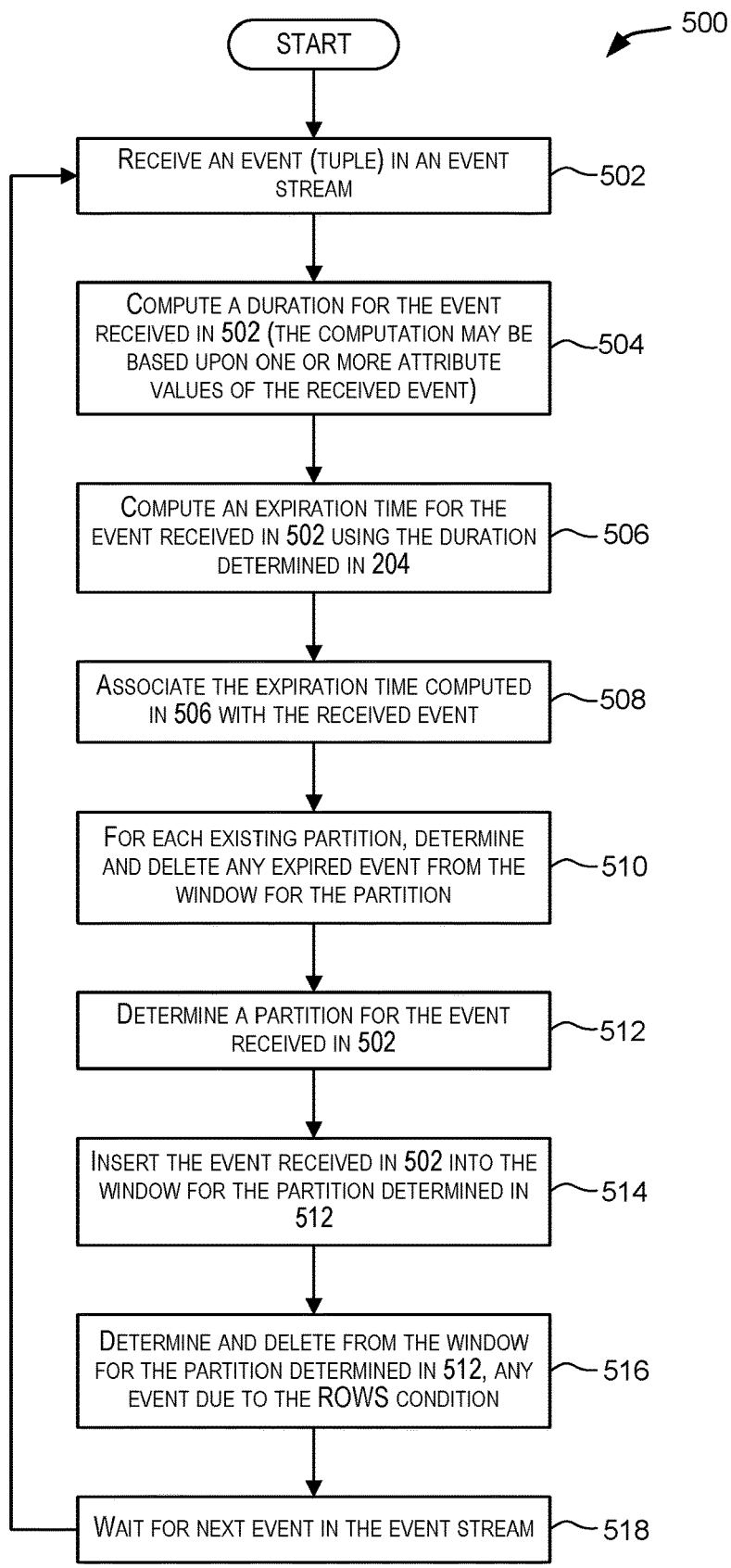
FIG. 5 depicts a simplified flowchart depicting a method for managing variable duration windows for partitions according to an embodiment of the present invention.

FIG. 5 depicts a simplified flowchart 500 depicting a method for managing variable duration windows for partitions according to an embodiment of the present invention. The processing depicted in FIG. 5 may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 5 is not intended to be limiting.

In certain embodiments, the processing depicted in FIG. 5 may be performed as part of the continuous query execution each time that an input event (which may be an actual event or a heartbeat event) is received via an event stream. At 502, an input event (tuple) may be received in an event stream. The event may have associated time information (e.g., a timestamp). In some instances, the time associated with an event may represent the time when the event was received.

At 504, a duration of time for which the event is eligible to be kept in a row-time range window for a partition is computed for the received event. As part of 504, the range parameter specified for the row-time range window by the CQL code is determined and used to determine the duration. As previously described, in some embodiments, the continuous query may define the duration as a function of the values of one or more attributes of the received input event. In such a scenario, determining the duration in 504 may involve determining the values of one or more attributes of the event received in 502 and computing the duration for that event as a function of those values. Since the values of the one or more attributes used for computing the duration could be different for different events, this causes the duration to potentially vary for individual events.

For example, in certain embodiments, the duration may be set to the value of a particular attribute of the event. The value of that particular attribute may be determined in 504 and the row-time range window duration for the input event set to the determined value. In some other embodiments, the continuous query may define the duration for a row-time range window as an arithmetic expression based upon one or more attribute values. In such a scenario, in 504, the one or more attribute values for the received event may be determined and arithmetic expression then evaluated using the determined values to compute a duration for the received event.

At 506, an expiration time is computed for the received event based upon the duration determined in 504. In one embodiment, Expiration time for an event=t+T where, "t" is the time associated with the event received in 502 (e.g., the arrival time of the event) and "T" is the duration determined in 504.

At 508, the expiration time computed in 506 may be associated with the event received in 502. For example, the expiration time information may be stored such that EPS 102 can, given an event, easily determine the expiration time computed for the event.

At 510, for each existing partition, the row-time range window for that partition is checked to identify and delete any expired events. For any event identified as having expired, the event is deleted or removed from that partition row-time range window. In one embodiment, an event in a row-time range window is considered to have expired if the expiration time computed for the event is equal to or earlier than the present time. As described above, the expiration time for an event is computed as (t+T). Accordingly, the event is considered to have expired if the current time ($t_P$) is same as or later than (t+T).

At 512, a partition is determined for the input event received in 502. The partition to which the event belongs may depend upon the value of an attribute of the event. Accordingly, in 512, the value of the attribute used for partitioning the input event stream is checked for the received input event and the partition to which the event belongs determined based upon that value.

At 514, the event received in 502 is inserted or added to the row-time range window of the partition determined in 512.

As described above, for an

S [partition by A1, . . . , Ak rows N range T]

clause, the removal of an event from a partition is controlled either by the expiration time for the event or based upon the total number of events in the row-time range window. For example, " . . . rows N . . . " implies that at most "N" events can be in the row-time range window for a partition and when a new event is received and added to the window, the earliest event in the partition is deleted from the row-time range window to maintain the "rows N" condition. Accordingly, in 516, the row-time range window for the partition determined in 512 is checked to identify and delete any events to conform to the "rows N" condition. In some embodiments, the processing in 516 may be performed prior to the processing in 514, or alternatively the processing performed in 514 and 516 may be performed together.

At 518, processing then waits for the next event in the event stream. Upon receiving the next event, processing is repeated from 502.

The various modules depicted in FIG. 3, and described above, may also be used in partition-based variable duration time-based windows processing according to an embodiment of the present invention. In one embodiment, duration and expiration time evaluator module 302 may be adapted to perform the processing in 502, 504, 506, and 508 in FIG. 5. In addition to the various functions described earlier, time-based window operator module 304 may be adapted to manage the possibly multiple partition row-time range windows. For example, time-based window operator 304 may be configured to perform the processing according to 510, 512, 514, and 516 in FIG. 5.

Various data structures may be used to implement row-time range windows for the various partitions. In one embodiment, a set of priority queues may be used, with each priority queue corresponding to a row-time range window for a particular partition. In a priority queue representing a row-time range window for a partition, the priority may be dictated by the expiration time computed for the events in the row-time range window. Newly received events belonging to a partition are added to the priority queue for that partition. For a partition, expired events and/or events that are removed from the partition row-time range window due to the "row N" condition are deleted from the corresponding priority queue.

Within a queue for a partition, the events in the queue may be sorted based upon their associated expiration times. In one embodiment, the events are sorted such that events having earlier expiration times are closer to the head of the queue and events having later expiration times are towards the tail of the queue. At any time instance, the priority queue for a partition may comprise zero or more events representing the zero or more events in the window at that time instance for the partition.

Figure 6:
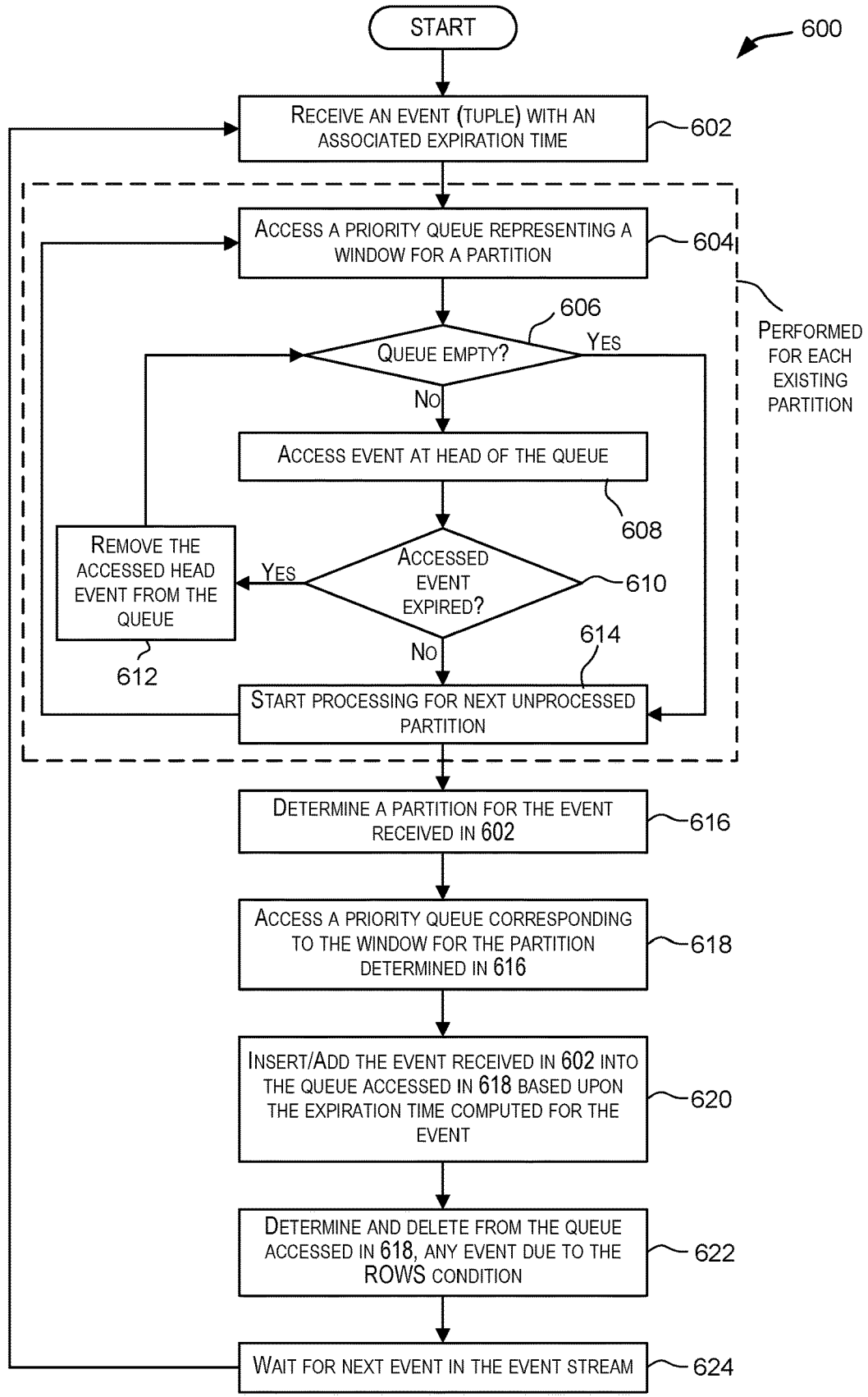
FIG. 6 depicts a simplified flowchart depicting processing that may be performed by a time-based window operator for handling variable duration windows for partitions using priority queues according to an embodiment of the present invention.

FIG. 6 depicts a simplified flowchart 600 depicting processing that may be performed by time-based window operator 304 for handling variable duration windows for partitions using priority queues according to an embodiment of the present invention. The processing depicted in FIG. 6 may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 6 is not intended to be limiting.

At 602, a newly received input event with an associated expiration time may be received. The expiration time for the event may have been calculated by duration and expiration time evaluator 302.

Processing according to 604, 606, 608, 610, 614, and 612 is performed for each existing partition. At 604, a priority queue corresponding to a row-time range window for an unprocessed partition is accessed. At 606, a determination is made if the queue is empty. An empty queue indicates that there are presently no events in that partition row-time range window. If it is determined in 606 that the queue is empty, then processing continues with 614 where processing for the next unprocessed partition is resumed starting with 604. If it is determined in 606 that the queue is not empty, then processing continues with 608.

At 608, the event at the head of the priority queue for the partition being processed is accessed. Since event elements in the priority queue for the partition are always sorted based upon the expiration times associated with the events, with events having earlier expiration times being closer to the head of the queue and events having later expiration times being towards the tail of the queue, the event at the head of the queue represents an event in that partition window with the earliest expiration time.

At 610, it is determined whether the event accessed in 608 has expired. In one embodiment, the event is considered expired if the expiration time associated with the accessed event is equal to or earlier than the current time. For example, if the current time is at the 10 second mark, the accessed event is considered expired if the expiration time associated with the accessed event is 10 seconds or less than 10 seconds. If it is determined in 610 that the accessed event has expired, then at 612, the accessed event is removed or deleted from the priority queue for the partition and processing then continues with 606. If it is determined in 610 that the accessed event has not expired, then processing continues with 614. In this manner, the processing in 604, 606, 608, 610, 612, and 614 is repeated until all expired events have been deleted from the row-time range windows for the various partitions. Processing then continues with 616.

At 616, a partition is determined for the event received in 602. The partition for the event may be determined based upon a value of an attribute of the input event.

At 618, a priority queue corresponding to the row-time range window for the partition determined in 616 is accessed. At 620, the event is inserted or added to the priority queue accessed in 618. In one embodiment, the event may be inserted based upon the expiration time computed for the event such that the queue elements remain sorted based upon the expiration times computed for the events in the queue.

In certain embodiments, a hashing function may be used to access the queue corresponding to the particular partition determined in 616. The value of the attribute(s) used for partitioning the input event stream may be provided as an input to the hashing function and the hashing function then returns a reference (e.g., a pointer) to the queue corresponding to the row-time range for that partition.

At 622, the queue accessed in 618 is processed to identify and delete any events from the queue in order to conform to the "rows N" condition. At 624, processing then waits for the next event in the event stream. Upon receiving the next event, processing is repeated from 602.

In the manner described above, the duration of time that an event is eligible to remain in a time-based window can vary from one event to another. Further, in certain embodiments, the duration for an event can be based upon and be a function of one or more attributes of the event itself. The duration of time that an event is eligible to remain in the time-based window (either a regular time-based window or a row-time range window for a partition) can vary from one event to another and is thus event specific.

There are several consequences of events remaining in a time-based window for variable time durations. One consequence is that for two events received at the same time (e.g., having the same associated timestamp), the duration of time that the events spend in a time-based window can be different. As a result, the expiration times for the two events can also be different. For example, a continuous query may be defined for an event stream, where the duration of the time-based window is a function of the value of attribute "attr" in the schema for the stream. Consider two events where a first event ($e_1$) is received at time $t_1$ and a second event ($e_2$) is also received at time $t_1$. Further, let's assume that value of attribute "attr" in $e_1$ is $a_1$ and the value of attribute "attr" in $e_2$ is $a_2$, where $a_2$ is not the same as $a_1$. Accordingly:

Time-based window duration for $e_1 = a_1$
Expiration time for $e1 = t_1 + a_1$
Time-based window duration for $e_2 = a_2$
Expiration time for $e_2 = t_1 + a_2$ Since $a_1$ and $a_2$ are not the same, the expiration time for $e_1$ (i.e., $t_1 + a_1$) is not the same as the expiration time for $e_2$ (i.e., $t_1 + a_2$). Thus, even though the two events are received at the same time (i.e., have the same associated time information), the two events expire at two different times and thus remain in the window for different durations. This was not possible in prior implementations of a time-based window, where two events received at the same time always expired from the window at the same time.

As another consequence of variable duration time-based windows, it is possible for an earlier received event to have an associated expiration time that is later than the expiration time associated with a later received event, or in other words, the later received event expires from the window before the earlier received event. For example, taking the above example, let's assume that the first event ($e_1$) is received at time $t_1$ and the second event ($e_2$) is received at time $t_2$, where $t_2$ is later than $t_1$. Further, let's assume that value of attribute "attr" in $e_1$ is $a_1$ and the value of attribute "attr" in $e_2$ is $a_2$. Accordingly:

Time-based window duration for $e_1 = a_1$
Expiration time for $e1 = t_1 + a_1$
Time-based window duration for $e_2 = a_2$
Expiration time for $e_2 = t_2 + a_2$ It is possible that the expiration time for $e_2$ (i.e., $t_2 + a_2$) is earlier than the expiration time for $e_1$ (i.e., $t_1 + a_1$), i.e., ($t_2 + a_2$) is earlier than ($t_1 + a_1$). Accordingly, even though event $e_2$ arrives later it expires before event $e_1$. This was not possible in prior implementations of a time-based window, where an earlier received event always expired before a later received event since the window duration for the two events was the same.

Variable duration time-based windows enable a user to control the duration of time that an event spends in the window, where the duration can be different for different events. This is useful in various different applications. For example, consider an application that is configured to process a stream of events related to products-related information. It is possible that the shelf life for each product is different (e.g., shelf life for perishables is less than the shelf life for non-perishables). For an application that needs to vary the duration of the time-based window based upon the shelf life for a product, the schema for the stream may be specified such that the shelf life is added as an attribute to the schema. The time-based window for an event may then be based on the value specified by the shelf life attribute. Other examples of applications that can make use of variable duration time-based windows include without restriction: applications related to events for different tasks having different associated alarms timers, tasks having different completion dates, etc.

As discussed above, the window time duration for an event can be based upon one or more attributes of the event itself. In certain embodiments, the attributes upon which the time duration is based may be part of the input event stream schema itself. However, in some embodiments, such attributes may not be part of the received input stream. In one such embodiment, the one or more attributes to be used for determining the window time duration may be added to the event stream by deriving a new stream from the original stream where the one or more attributes upon which the duration calculation is based are part of the schema of the derived event stream.

Figure 7:
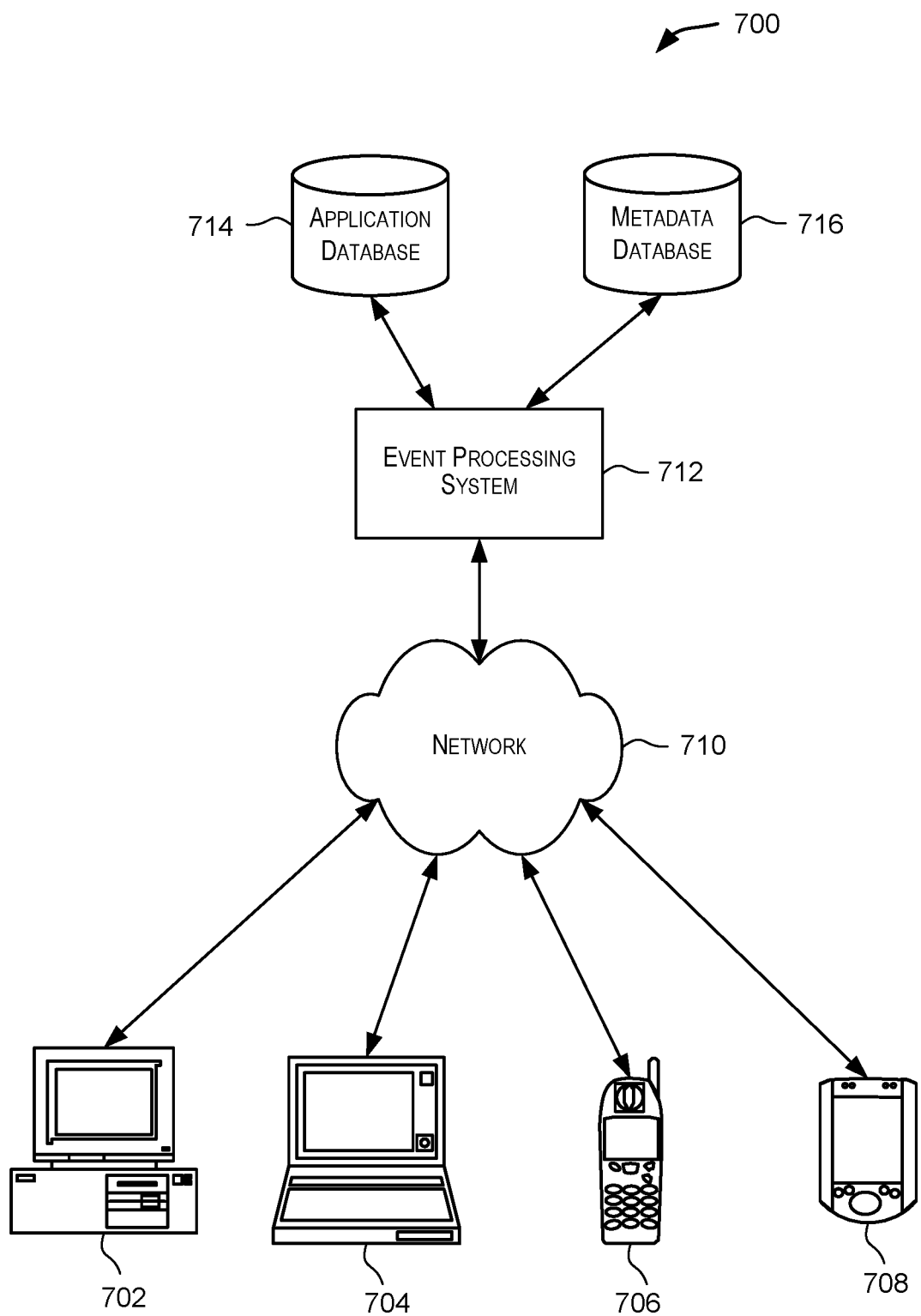
FIG. 7 is a simplified block diagram illustrating components of a system environment that may be used in accordance with an embodiment of the present invention.

FIG. 7 is a simplified block diagram illustrating components of a system environment 700 that may be used in accordance with an embodiment of the present invention. As shown, system environment 700 includes one or more client computing devices 702, 704, 706, 708, which are configured to operate a client application such as a web browser, proprietary client (e.g., Oracle Forms), or the like. In various embodiments, client computing devices 702, 704, 706, and 708 may interact with an event processing system 712.

Client computing devices 702, 704, 706, 708 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 702, 704, 706, and 708 may be any other electronic device, such as a thin-client computer, Internet-enabled gaming system, and/or personal messaging device, capable of communicating over a network (e.g., network 710 described below). Although exemplary system environment 700 is shown with four client computing devices, any number of client computing devices may be supported. Other devices such as devices with sensors, etc. may interact with system 712.

A network 710 may facilitate communications and exchange of data between clients 702, 704, 706, and 708 and event processing system 712. Network 710 may be any type of network familiar to those skilled in the art that can support data communications using any of a variety of commercially-available protocols, including without limitation TCP/IP, SNA, IPX, AppleTalk, and the like. Merely by way of example, network 710 can be a local area network (LAN) such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.1X suite of protocols, the Bluetooth protocol known in the art, and/or any other wireless protocol); and/or any combination of these and/or other networks.

Event processing system 712 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, system 712 may be adapted to run one or more services or software applications described in the foregoing disclosure.

System 712 may run an operating system including any of those discussed above, as well as any commercially available server operating system. System 712 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 700 may also include one or more databases 714 and 716. Databases 714 and 716 may reside in a variety of locations. By way of example, one or more of databases 714 and 716 may reside on a storage medium local to (and/or resident in) system 712. Alternatively, databases 714 and 716 may be remote from system 712, and in communication with system 712 via a network-based or dedicated connection. In one set of embodiments, databases 714 and 716 may reside in a storage-area network (SAN) familiar to those skilled in the art. Similarly, any necessary files for performing the functions attributed to system 712 may be stored locally on system 712 and/or remotely, as appropriate. In one set of embodiments, databases 714 and 716 may include relational databases, such as Oracle 11 g, which are adapted to store, update, and retrieve data in response to SQL-formatted commands.

Figure 8:
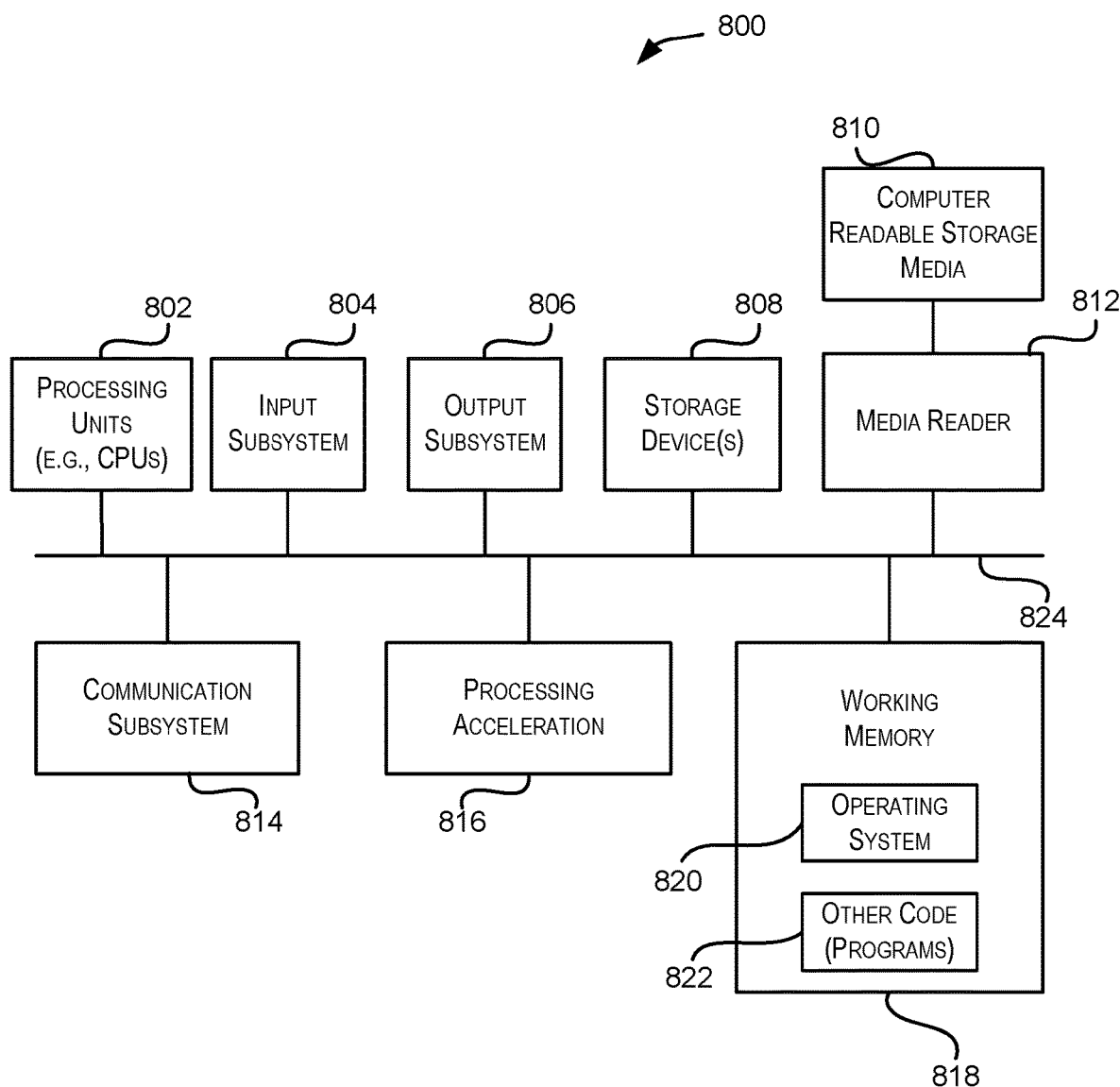
FIG. 8 is a simplified block diagram of a computer system that may be used in accordance with certain embodiments of the present invention.

FIG. 8 is a simplified block diagram of a computer system 800 that may be used in accordance with certain embodiments of the present invention. For example, system 800 may be used to implement event processing system 100 depicted in FIG. 1. Computer system 800 is shown comprising various components that may be electrically coupled via a bus 824. The components may include one or more processing units 802, an input subsystem 804, an output subsystem 806, storage devices 808, a computer-readable storage media reader 812 connected to a computer-readable storage medium 810, a communication subsystem 814, a processing acceleration subsystem 816, and working memory 818.

Bus subsystem 824 provides a mechanism for letting the various components and subsystems of computer system 800 communicate with each other as intended. Although bus subsystem 824 is shown schematically as a single bus, alternative embodiments of the bus subsystem may utilize multiple busses.

Input subsystem 804 may include one or more input devices such as a mouse, a keyboard, a pointing device, a touchpad, etc. In general, input subsystem 804 may include any device or mechanism for inputting information to computer system 800.

Output subsystem 806 may include one or more output devices for outputting information from computer system 800. Examples of output devices include without limitation a display device, a printer, a projection device, etc. In general, output subsystem 806 may include any device or mechanism for outputting information from computer system 800.

Processing unit(s) 802 can include one or more processors, one or more cores of processors, combinations thereof, and the like. In some embodiments, processing unit(s) 802 can include a general purpose primary processor as well as one or more special purpose co-processors such as graphics processors, digital signal processors, or the like. In some embodiments, some or all processing units 802 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 802 can execute instructions stored in working memory 818 or on storage devices 808. In various embodiments, processing units 802 can execute a variety of programs or code instructions and can maintain multiple concurrently executing programs or processes. At any given time, some or all of the program code to be executed can be resident in system working memory 818, storage devices 808, and/or on computer-readable storage media 810. Through suitable programming, processing units 802 can provide various functionalities described above for performing event stream-related processing. In some embodiments, computer system 800 may also include a processing acceleration unit 816, which can include a digital signal processor (DSP), a special-purpose processor, and/or the like.

Storage device(s) 808 may include memory devices such as disk drives, optical storage devices, and solid-state storage devices such as a random access memory (RAM) and/or a read-only memory (ROM), which can be programmable, flash-updateable and/or the like. Software (programs, code modules, instructions), which when executed by processing unit(s) 802 to provide the functionality described above, may be stored on storage devices 808. Storage devices 808 may also provide a repository for storing data used in accordance with embodiments of the present invention.

Computer-readable storage media reader 812 can further be connected to a computer-readable storage medium 810, together (and, optionally, in combination with storage device(s) 808) comprehensively representing remote, local, fixed, and/or removable memory storage devices plus storage media for temporarily and/or more permanently containing computer-readable information.

Communications subsystem 814 may permit data to be exchanged with network 710 and/or any other computers described above with respect to system environment 700. Communication subsystem 814 serves as an interface for receiving data from and transmitting data to other systems from computer system 800. The communication may be provided using wired or wireless protocols. For example, communication subsystem 814 may enable computer 800 to connect to a client device via the Internet. Communication subsystem 814 may comprise a modem, a network card (wireless or wired), an infra-red communication device, a GPS receiver, etc.

Working memory subsystem 818 may include a number of memories including a main random access memory (RAM) for storage of instructions and data during program execution and a read only memory (ROM) in which fixed instructions are stored. Software elements such as an operating system 820 and/or other code 822, such as an application program (which may be a client application, Web browser, mid-tier application, RDBMS, etc.), may be stored in working memory 818. In an exemplary embodiment, working memory 818 may include executable code and associated data structures (such as caches) used for processing events and enabling variable duration windows processing as described above.

It should be appreciated that alternative embodiments of computer system 800 may have more or less components with numerous variations from that described above. For example, customized hardware might also be used and/or particular elements might be implemented in hardware, software (including portable software, such as applets), or both. Further, connection to other computing devices such as network input/output devices may be employed.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method, comprising:
receiving, by a computing device, a query for an event stream with a specified time-based window, the specified time-based window identifying a set of events of the event stream that are eligible to be queried by the query;
determining, by the computing device, a first duration of time for a first event received via the event stream, the first duration of time indicating a time duration that the first event is eligible to remain in the time-based window specified for the event stream;
determining, by the computing device, a second duration of time for a second event received via the event stream, the second duration of time indicating a time duration that the second event is eligible to remain in the time-based window, wherein the second duration of time is different from the first duration of time;
removing, by the computing device, the first event from the time-based window after the first event has been in the time-based window for the first duration of time;
removing, by the computing device, the second event from the time-based window after the second event has been in the time-based window for the second duration of time;
executing, by the computing device, the query against the set of events received via the event stream that are present within the time-based window when the query is executed; and
generating, by the computing device, a set of one or more output events based at least in part on executing the query against the set of events.

2. The method of claim 1, wherein the event stream is generated by one or more event sources.

3. The method of claim 1, wherein the query specifies an expression indicating parameters for calculating expiration durations for each event received via the event stream based at least in part on an attribute of each respective event.

4. The method of claim 3, wherein the first duration of time is determined based at least in part on a first attribute of the first event and the specified expression.

5. The method of claim 4, wherein:
the expression specified in the query identifies a first attribute or a second attribute from one or more attributes;
the first duration of time for the first event is determined based at least in part on a first value of the first attribute of the first event; and
the second duration of time for the second event is determined based at least in part on a second value of the first attribute of the second event, the second value being different from the first value.

6. The method of claim 1, wherein:
the first event has an associated first time, wherein the first duration of time corresponds to a first time of receipt of the first event by the computing device that received the first event via the event stream;
the second event has an associated second time, wherein the second duration of time corresponds to a second time of receipt of the second event by the computing device that received the second event via the event stream; and
the first time and the second time are the same.

7. The method of claim 1, wherein:
the first event has an associated first time, wherein the first time corresponds to a first time of receipt of the first event by the computing device that received the first event via the event stream;
the second event has an associated second time, wherein the second time corresponds to a second time of receipt of the second event by the computing device that received the second event via the event stream; and
the first time is different from the second time.

8. The method of claim 1, further comprising:
determining, based at least in part on a first value of a first attribute of the first event, a first partition for the first event; and
determining, based at least in part on a second value of a second attribute of the second event, that the second event belongs to the first partition, wherein the time-based window is for the first partition.

9. The method of claim 1, further comprising:
determining, by the computing device, a first expiration time for the first event based at least in part on a first time associated with the first event and the first duration of time that the first event is eligible to remain in the time-based window, the first duration of time determined based at least in part on a first value of a first attribute of the first event; and
determining, by the computing device, a second expiration time for the second event based at least in part on a second time associated with the second event and the second duration of time that the second event is eligible to remain in the time-based window, the second duration of time determined based at least in part on a second value of the first attribute of the second event, the second value being different from the first value; and wherein:

removing the first event from the time-based window comprises removing the first event from the time-based window at or after an occurrence of the first duration of time; and removing the second event from the time-based window comprises removing the second event from the time-based window at or after an occurrence of the second duration of time, the second duration of time being different from the first duration of time.

10. A computing device, comprising:
a memory; and
one or more processing units, the one or more processing units configured to:
receive a query for an event stream with a specified time-based window, the time-based window identifying a set of events of the event stream that are eligible to be queried by the query;
determine a first duration of time for a first event received via the event stream, the first duration of time indicating a time duration that the first event is eligible to remain in the time-based window specified for the event stream;
determine a second duration of time for a second event received via the event stream, the second duration of time indicating a time duration that the second event is eligible to remain in the time-based window, wherein the second time duration is different from the first time duration;
remove the first event from the time-based window after the first event has been in the time-based window for the first duration of time;
remove the second event from the time-based window after the second event has been in the time-based window for the second duration of time;
execute the query against the set of events received via the event stream that are present within the time-based window when the query is executed; and
generate a set of one or more output events based at least in part on executing the query against the set of events.

11. The computing device of claim 10, wherein the event stream is generated by one or more event sources.

12. The computing device of claim 10, wherein the query specifies an expression indicating parameters for calculating expiration durations for each event received via the event stream based at least in part on an attribute of each respective event.

13. The computing device of claim 12, wherein the first duration of time is determined based at least in part on a first attribute of the first event and the specified expression.

14. The computing device of claim 13, wherein:
the expression specified in the query identifies a first attribute or a second attribute from one or more attributes;
the first duration of time for the first event is determined based at least in part on a first value of the first attribute of the first event; and
the second duration of time for the second event is determined based at least in part on a second value of the first attribute of the second event, the second value being different from the first value.

15. The computing device of claim 10, wherein:
the first event has an associated first time, wherein the first time corresponds to a first time of receipt of the first event by the computing device that received the first event via the event stream;
the second event has an associated second time, wherein the second time corresponds to a second time of receipt of the second event by the computing device that received the second event via the event stream; and
the first time and the second time are the same.

16. The computing device of claim 10, wherein:
the first event has an associated first time, wherein the first time corresponds to a first time of receipt of the first event by the computing device that received the first event via the event stream;
the second event has an associated second time, wherein the second time corresponds to a second time of receipt of the second event by the computing device that received the second event via the event stream; and
the first time is different from the second time.

17. The computing device of claim 10, further comprising:
determining, based at least in part on a first value of a first attribute of the first event, a first partition for the first event; and
determining, based at least in part on a second value of a second attribute of the second event, that the second event belongs to the first partition, wherein the time-based window is for the first partition.

18. A computer-readable memory storing a plurality of instructions executable by one or more processing units, the plurality of instructions comprising instructions for:
receiving a query for an event stream with a specified time-based window, the time-based window identifying a set of events of the event stream that are eligible to be queried by the query;
determining a first duration of time for a first event received via the event stream, the first duration of time indicating a time duration that the first event is eligible to remain in the time-based window specified for the event stream;
determining a second duration of time for a second event received via the event stream, the second duration of time indicating a time duration that the second event is eligible to remain in the time-based window, wherein the second time duration is different from the first time duration;
removing the first event from the time-based window after the first event has been in the time-based window for the first duration of time;
removing the second event from the time-based window after the second event has been in the time-based window for the second duration of time;
executing the query against the set of events received via the event stream that are present within the time-based window when the query is executed; and
generating a set of one or more output events based at least in part on executing the query against the set of events.

19. The computer-readable memory of claim 18, wherein:
the first event has an associated first time, wherein the first time corresponds to a first time of receipt of the first event by a computing device that received the first event via the event stream;
the second event has an associated second time, wherein the second time corresponds to a second time of receipt of the second event by the computing device that received the second event via the event stream; and the first time and the second time are the same.

20. The computer-readable memory of claim 18, wherein the plurality of instructions further comprise instructions for:

determining, based at least in part on a first value of a first attribute of the first event, a first partition for the first event; and determining, based at least in part on a second value of a second attribute of the second event, that the second event belongs to the first partition, wherein the time-based window is for the first partition.

* * * * *

UNITED STATES PATENT AND TRADEMARK OFFICE
CERTIFICATE OF CORRECTION

| | |
|---|---|
| PATENT NO. | : 10,644,932 B2 |
| APPLICATION NO. | : 16/265610 |
| DATED | : May 5, 2020 |
| INVENTOR(S) | : Bishnoi et al. |

It is certified that error appears in the above-identified patent and that said Letters Patent is hereby corrected as shown below:

On the Title Page

On page 3, Column 2, Item (56) under Other Publications, Line 32, delete "Paent" and insert -- Patent --, therefor.

In the Specification

In Column 18, Line 36, delete "<range_expression>]]" and insert -- <range_expression>] --, therefor.

In Column 21, Line 25, delete "(3000,b, 1)" and insert -- (3000,b,1) --, therefor.

In Column 22, Line 65, delete "(7000,c, 1)" and insert -- (7000,c,1) --, therefor.

In Column 23, Line 5, delete "(7000,c, 1)" and insert -- (7000,c,1) --, therefor.

In Column 23, Line 15, delete "(7000,c, 1)." and insert -- (7000,c,1). --, therefor.

In Column 23, Line 29, delete "(7000,c, 1)" and insert -- (7000,c,1) --, therefor.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*